United States Patent

(12) United States Patent  
Norton

(10) Patent No.: US 8,251,283 B1  
(45) Date of Patent: Aug. 28, 2012

(54) TOKEN AUTHENTICATION USING SPATIAL CHARACTERISTICS

(75) Inventor: Kirkpatrick W. Norton, San Diego, CA (US)

(73) Assignee: Oberon Labs, LLC, Rancho Santa Fe, CA (US)

( * ) Notice: Subject to any disclaimer, the term of this patent is extended or adjusted under 35 U.S.C. 154(b) by 198 days.

(21) Appl. No.: 12/437,801

(22) Filed: May 8, 2009

(51) Int. Cl.
- G06F 17/00 (2006.01)
- G06K 5/00 (2006.01)
- G06K 19/06 (2006.01)
- G06K 7/08 (2006.01)
- G06K 9/46 (2006.01)
- G06Q 20/00 (2012.01)
- H04L 9/32 (2006.01)

(52) U.S. Cl. ........ 235/380; 235/375; 235/449; 235/493; 705/75; 705/76; 726/20; 382/190; 382/191; 713/176

(58) Field of Classification Search .................. 235/380, 235/493, 449, 375; 705/75–76; 726/20; 382/190–191; 713/176  
See application file for complete search history.

(56) References Cited

U.S. PATENT DOCUMENTS

| | | |
|---|---|---|
| 3,953,887 A | 4/1976 | Kobylarz et al. |
| 3,962,726 A | 6/1976 | Deland et al. |
| 4,028,734 A | 6/1977 | Mos |
| 4,297,735 A | 10/1981 | Eppich |
| 4,319,131 A | 3/1982 | McGeary et al. |
| 4,628,195 A | 12/1986 | Baus |
| 4,650,978 A | 3/1987 | Hudson et al. |
| 4,705,939 A | 11/1987 | Ulinski |
| 4,837,426 A | 6/1989 | Pease |
| 4,906,988 A | 3/1990 | Copella |
| 4,908,516 A * | 3/1990 | West ............................... 250/556 |
| 4,944,619 A | 7/1990 | Suzuki et al. |
| 4,949,192 A | 8/1990 | McGeary |
| 5,010,240 A | 4/1991 | Sheldon |
| 5,097,504 A | 3/1992 | Camion et al. |
| 5,101,097 A | 3/1992 | Conant |
| 5,126,990 A | 6/1992 | Efron et al. |
| 5,214,409 A | 5/1993 | Beigel |
| 5,233,169 A | 8/1993 | Longacre |

(Continued)

FOREIGN PATENT DOCUMENTS

DE    102 12 786    10/2003

(Continued)

OTHER PUBLICATIONS

NuGen I.T., "Response to CCIF Parts and Material Committee", Enterprise Workflow, NuGen I.T., The Internet Integration Company.

(Continued)

Primary Examiner — Michael G Lee  
Assistant Examiner — Laura Gudorf  
(74) Attorney, Agent, or Firm — Sheppard Mullin Richter & Hampton LLP

(57) ABSTRACT

Systems and methods for token authentication analyze token data over one or more read operations to compute a characteristic master signature for the token. This can be accomplished, for example by analyzing the token data statistically to compute a characteristic signature for the token. Similar techniques can be used to generate a subsequent signature that can be verified against the original characteristic signature to authenticate the token. For example, a signature can be generated on a per use basis and that signature verified against the characteristic signature to validate the token upon use.

32 Claims, 6 Drawing Sheets

U.S. PATENT DOCUMENTS

| | | | |
|---|---|---|---|
| 5,235,166 A | 8/1993 | Fernadez | |
| 5,254,843 A | 10/1993 | Hynes et al. | |
| 5,257,320 A | 10/1993 | Etherington et al. | |
| 5,270,523 A | 12/1993 | Chang et al. | |
| 5,336,871 A | 8/1994 | Colgate | |
| 5,354,097 A | 10/1994 | Tel | |
| 5,358,088 A | 10/1994 | Kryder | |
| 5,365,586 A | 11/1994 | Indeck et al. | |
| 5,367,581 A | 11/1994 | Abel et al. | |
| 5,393,966 A | 2/1995 | Gatto et al. | |
| 5,396,369 A | 3/1995 | Deland et al. | |
| 5,408,505 A | 4/1995 | Indeck et al. | |
| 5,412,718 A | 5/1995 | Narasimhalu | |
| 5,428,683 A | 6/1995 | Indeck et al. | |
| 5,430,279 A | 7/1995 | Fernandez | |
| 5,459,629 A | 10/1995 | Wakasugi | |
| 5,461,525 A | 10/1995 | Christianson et al. | |
| 5,479,509 A | 12/1995 | Ugon | |
| 5,546,462 A | 8/1996 | Indeck et al. | |
| 5,552,947 A | 9/1996 | Nakanishi et al. | |
| 5,569,898 A | 10/1996 | Fisher et al. | |
| 5,570,339 A | 10/1996 | Nagano | |
| 5,572,507 A | 11/1996 | Ozaki et al. | |
| 5,587,654 A | 12/1996 | Indeck et al. | |
| 5,603,078 A | 2/1997 | Henderson | |
| 5,616,904 A | 4/1997 | Fernandez | |
| 5,625,689 A | 4/1997 | Indeck et al. | |
| 5,644,636 A | 7/1997 | Fernandez | |
| 5,657,389 A | 8/1997 | Houvener | |
| 5,685,657 A | 11/1997 | Jablonski | |
| 5,691,526 A | 11/1997 | Evans | |
| 5,708,422 A | 1/1998 | Blonder et al. | |
| 5,740,244 A | 4/1998 | Indeck et al. | |
| 5,767,495 A | 6/1998 | DeLand | |
| 5,770,846 A | 6/1998 | Mos | |
| 5,780,828 A | 7/1998 | Mos et al. | |
| 5,814,796 A | 9/1998 | Benson et al. | |
| 5,829,743 A | 11/1998 | DeLand, Jr. et al. | |
| 5,920,628 A | 7/1999 | Indeck et al. | |
| 5,930,794 A | 7/1999 | Linenbach et al. | |
| 5,959,794 A | 9/1999 | Indeck et al. | |
| 6,024,288 A | 2/2000 | Gottlich | |
| 6,038,321 A | 3/2000 | Torigai et al. | |
| 6,053,406 A | 4/2000 | Litman | |
| 6,098,881 A | 8/2000 | DeLand et al. | |
| 6,105,011 A | 8/2000 | Morrison | |
| 6,123,259 A | 9/2000 | Ogasawara | |
| 6,260,146 B1 | 7/2001 | Mos et al. | |
| 6,266,647 B1 | 7/2001 | Fernandez | |
| 6,308,886 B1 | 10/2001 | Benson et al. | |
| 6,335,799 B1 | 1/2002 | Provost | |
| 6,430,008 B1 | 8/2002 | Trabert et al. | |
| 6,431,445 B1 * | 8/2002 | DeLand et al. | 235/449 |
| 6,476,991 B1 | 11/2002 | Fernandez | |
| 6,480,356 B1 | 11/2002 | Mos | |
| 6,543,689 B2 | 4/2003 | Sabella | |
| 6,641,050 B2 | 11/2003 | Kelley et al. | |
| 6,644,547 B1 | 11/2003 | White | |
| 6,678,103 B2 | 1/2004 | Fernandez et al. | |
| 6,678,823 B1 | 1/2004 | Fernandez | |
| 6,760,841 B1 | 7/2004 | Fernandez | |
| 6,781,781 B2 | 8/2004 | Wood | |
| 6,830,182 B2 | 12/2004 | Izuyama | |
| 6,830,183 B2 | 12/2004 | Von Mueller et al. | |
| 6,837,435 B2 | 1/2005 | Kehoe et al. | |
| 6,885,748 B1 | 4/2005 | Wang | |
| 6,899,269 B1 | 5/2005 | Deland | |
| 6,901,375 B2 | 5/2005 | Fernandez | |
| 6,944,782 B2 | 9/2005 | Von Mueller et al. | |
| 6,963,980 B1 | 11/2005 | Mattsson | |
| 6,993,130 B1 | 1/2006 | Fernandez et al. | |
| 7,013,393 B1 | 3/2006 | Stevens | |
| 7,068,207 B2 | 6/2006 | Fujita et al. | |
| 7,068,787 B1 | 6/2006 | Ta et al. | |
| 7,103,575 B1 | 9/2006 | Linehan | |
| 7,113,930 B2 | 9/2006 | Eccles | |
| 7,120,933 B2 | 10/2006 | Mattsson | |
| 7,305,707 B2 | 12/2007 | Mattsson | |
| 7,313,822 B2 | 12/2007 | Ben-Itzhak | |
| 7,325,129 B1 | 1/2008 | Mattsson | |
| 7,418,098 B1 | 8/2008 | Mattsson | |
| 7,490,248 B1 | 2/2009 | Valfridsson | |
| 7,539,857 B2 | 5/2009 | Bartlett | |
| 754,862 A1 | 6/2009 | Carr | |
| 2001/0047355 A1 | 11/2001 | Anwar | |
| 2002/0017559 A1 | 2/2002 | Mos et al. | |
| 2002/0017560 A1 | 2/2002 | Mos et al. | |
| 2002/0023215 A1 | 2/2002 | Wang et al. | |
| 2002/0046338 A1 | 4/2002 | Ueda et al. | |
| 2002/0145051 A1 | 10/2002 | Charrin | |
| 2002/0152180 A1 | 10/2002 | Turgeon | |
| 2002/0178145 A1 | 11/2002 | Ishida | |
| 2003/0028481 A1 | 2/2003 | Flitcroft et al. | |
| 2003/0061156 A1 | 3/2003 | Lim | |
| 2003/0061171 A1 | 3/2003 | Gilbert et al. | |
| 2003/0085277 A1 | 5/2003 | DeLand et al. | |
| 2003/0089774 A1 | 5/2003 | Schmieder et al. | |
| 2003/0105725 A1 | 6/2003 | Hoffman | |
| 2003/0105967 A1 | 6/2003 | Nam | |
| 2003/0145205 A1 | 7/2003 | Sarcanin | |
| 2003/0146846 A1 | 8/2003 | Fujita et al. | |
| 2003/0192948 A1 | 10/2003 | Izuyama | |
| 2003/0213840 A1 | 11/2003 | Livingston et al. | |
| 2004/0006699 A1 | 1/2004 | Von Mueller | |
| 2004/0049777 A1 | 3/2004 | Sullivan | |
| 2004/0203930 A1 | 10/2004 | Farchmin et al. | |
| 2004/0238627 A1 | 12/2004 | Silverbrook et al. | |
| 2005/0006472 A1 * | 1/2005 | Verschuur et al. | 235/451 |
| 2005/0036611 A1 | 2/2005 | Seaton et al. | |
| 2005/0044044 A1 | 2/2005 | Burger et al. | |
| 2005/0167495 A1 | 8/2005 | Morley et al. | |
| 2005/0167496 A1 | 8/2005 | Morley et al. | |
| 2005/0173530 A1 | 8/2005 | DeLand et al. | |
| 2005/0184165 A1 | 8/2005 | de Jong | |
| 2005/0198318 A1 | 9/2005 | Von Mueller | |
| 2005/0218229 A1 | 10/2005 | Morley et al. | |
| 2005/0228688 A1 | 10/2005 | Visser et al. | |
| 2005/0247787 A1 | 11/2005 | Von Mueller | |
| 2006/0046842 A1 | 3/2006 | Mattice et al. | |
| 2006/0049255 A1 | 3/2006 | Von Mueller | |
| 2006/0049256 A1 | 3/2006 | Von Mueller | |
| 2006/0061503 A1 | 3/2006 | Fujita et al. | |
| 2006/0179296 A1 | 8/2006 | Bartlett | |
| 2006/0249574 A1 | 11/2006 | Brown et al. | |
| 2007/0067634 A1 | 3/2007 | Siegler | |
| 2007/0067637 A1 | 3/2007 | Mattsson | |
| 2007/0101425 A1 | 5/2007 | Mattsson | |
| 2007/0242829 A1 | 10/2007 | Pedlow | |
| 2008/0022136 A1 | 1/2008 | Mattsson | |
| 2008/0082834 A1 | 4/2008 | Mattsson | |
| 2008/0082837 A1 | 4/2008 | Mattsson | |
| 2008/0084995 A1 | 4/2008 | Rodgers | |
| 2008/0098393 A1 | 4/2008 | Chai et al. | |
| 2008/0165973 A1 | 7/2008 | Miranda Gavillan et al. | |
| 2008/0170693 A1 | 7/2008 | Spies et al. | |
| 2009/0025057 A1 | 1/2009 | Mattsson | |
| 2009/0089591 A1 | 4/2009 | Mattsson | |
| 2010/0127079 A1 * | 5/2010 | Fang et al. | 235/449 |

FOREIGN PATENT DOCUMENTS

| | | |
|---|---|---|
| EP | 0644474 | 3/1995 |
| EP | 0 696 779 | 2/1996 |
| EP | 1363226 | 5/2002 |
| EP | 1460593 | 9/2004 |
| WO | 97/30533 | 8/1997 |
| WO | 01/65512 | 9/2001 |
| WO | WO 01/80189 | 10/2001 |
| WO | 02/43014 | 5/2002 |
| WO | 02/43015 | 5/2002 |
| WO | 02/067157 | 8/2002 |
| WO | 2006/010947 | 2/2006 |
| WO | 2006/020320 | 2/2006 |
| WO | 2006/111022 | 10/2006 |
| WO | 2008/100396 | 8/2008 |

OTHER PUBLICATIONS

CCC Information Services, Inc., "How to Read an Estimate Quality Review," (2005), http://www.ccis.com.

M. Bellare, K. Pietrzak, and P. Rogaway. Improved Security Analyses for CBC MACs. Advances in Cryptology—CRYPTO '05, LNCS vol. 3621, pp. 527-545, Springer, 2005.

Bellare, M., Rogaway, P. The Security of Triple Encryption and a Framework for Code-Based Game-Playing Proofs. Advances in Cryptology—EUROCRYPT '06, LNCS vol. 4004, pp. 409-426, Springer, 2006.

M. Bellare, A. Boldyreva, and A. O'Neill. Deterministic and efficiently searchable encryption. Advances in Cryptology—CRYPTO '07, LNCS vol. 4622, pp. 535-552, Springer, 2007.

M. Bellare, M. Fischlin, A. O'Neill, and T. Ristenpart. Deterministic encryption: Definitional equivalences and constructions without random oracles. Advances in Cryptology—CRYPTO '08, LNCS vol. 5157, pp. 360-378, Springer, 2008.

J. Black and P. Rogaway. CBC MACs for Arbitrary-Length Messages: The Three-Key Constructions. J. of Cryptology, vol. 18, No. 2, pp. 111-131, 2005.

J. Black and P. Rogaway. Ciphers with arbitrary finite domains. Topics in Cryptology—CT-RSA '02, LNCS vol. 2271, Springer, pp. 114-130, 2002.

J. Black, S. Halevi, H. Krawczyk, T. Krovetz, and P. Rogaway. UMAC: Fast and Secure Message Authentication. Advances in Cryptology—CRYPTO '99, LNCS vol. 1666. pp. 216-233, Springer, 1999.

J. Black and P. Rogaway. A Block-Cipher Mode of Operation for Parallelizable Message Authentication. Advances in Cryptology—Eurocrypt '02, LNCS vol. 2332, pp. 384-397, Springer, 2002.

A. Boldyreva, S. Fehr, and A. O'Neill. On notions of security for deterministic encryption, and efficient constructions without random oracles. Advances in Cryptology—CRYPTO '08, LNCS vol. 5157, pp. 335-359 Springer, 2008.

ISO/IEC 7812-1:2006. Identification cards—Identification of issuers—Part 1: Numbering system.

T. Iwata and K. Kurosawa. OMAC: One-Key CBC MAC. Fast Software Encryption—FSE '03, LNCS vol. 2887, pp. 129-153, Springer, 2003.

M. Liskov, R. Rivest, and D. Wagner. Tweakable block ciphers. Advances in Cryptology—CRYPTO 2002, LNCS vol. 2442, Springer, pp. 31-46, 2002.

M. Luby and C. Rackoff. How to construct pseudorandom permutations from pseudorandom functions. SIAM Journal of Computing, vol. 17, No. 2, pp. 373-386, 1988.

S. Lucks. Faster Luby-Rackoff ciphers. Fast Software Encryption 1996, LNCS vol. 1039, Springer, pp. 189-203, 1996.

U. Maurer and K. Pietrzak. The Security of Many-Round Luby-Rackoff Pseudo-Random Permutations. Advances in Cryptology—EUROCRYPT '03, LNCS vol. 2656, pp. 544-561, Springer, 2003.

M. Naor and O. Reingold. On the construction of pseudorandom permutations: Luby-Rackoff revisited. Journal of Cryptology, vol. 12, No. 1, pp. 29-66, 1999.

J. Patarin. New Results on Pseudorandom Permutation Generators Based on the DES Scheme. Advances in Cryptology—CRYPTO'91, LNCS vol. 576, Springer, pp. 301-312, 1991.

J. Patarin. Generic Attacks on Feistel Schemes. Advances in Cryptology—ASIACRYPT '01, LNCS vol. 2248, Springer, pp. 222-238, 2001.

J. Patarin. Luby-Rackoff: 7 Rounds Are Enough for $2n(1-Q)$ Security. Advances in Cryptology—CRYPTO '03, LNCS vol. 2729, Springer, pp. 513-529, 2003.

J. Patarin. Security of Random Feistel Schemes with 5 or More Rounds. Advances in Cryptology—CRYPTO '04, LNCS vol. 3152, Springer, pp. 106-122, 2004.

S. Patel, Z. Ramzan, and G. Sundaram. Efficient constructions of variable-input-length block ciphers. Selected Areas in Cryptography 2004, LNCS vol. 3357, pp. 326-340, 2004.

PCI Security Standards Council. Payment Card Industry Data Security Standard Version 1.2. Available from https://www.pcisecuritystandards.org/security_standards/pci_dss.shtml.

B. Schneier and J. Kelsey. Unbalanced Feistel networks and block cipher design. Fast Software Encryption 1996, LNCS vol. 1039, Springer, pp. 121-144, 1996.

R. Schroeppel. Hasty pudding cipher specification. First AES Candidate Workshop, 1998.

T. SPIES. Feistel Finite Set Encryption Mode. http://csrc.nist.gov/groups/ST/toolkit/15 BCM/documents/proposedmodes/ffsem/ffsem-spec.pdf.

Mattson, Ulf T., Format-Controlling Encryption Using Datatype-preserving Encryption.

Mattson, Ulf T., DB2 Security and PCI Compliance: A Best Practice Guide.

Satti, M.V. Kartik, A Quasigroup Based Cryptographic System.

Cisco Systems. Security: AP/Root Radio Data Encryption.

Crocker, David H., Standard for the Format of ARPA Internet Text Messages, RFC 822, Aug. 13, 1982.

International Search Report on for International App. No. PCT/US2010/034219, completed Aug. 11, 2010.

\* cited by examiner

TOKEN AUTHENTICATION USING SPATIAL CHARACTERISTICS

TECHNICAL FIELD

The present invention relates to token systems in general, and more particularly, some embodiments relate to spatial analysis of token data.

DESCRIPTION OF THE RELATED ART

Token systems have been in use in modern civilization in various implementations to provide and control many forms of access. Access that can be and often times is controlled by tokens can include physical access to rooms, buildings, areas and so on; electronic access to servers and data files; electronic account access; and so on. Another form of access controlled by tokens is the ability to conduct transactions such as, for example, credit, debit and other financial transactions. Credit cards, charge cards, debit cards, loyalty cards and other purchase-related tokens are used to provide the consumers with ready access to funds. Such transactions can enhance convenience of purchases, extend credit to customers, and so on.

As modern society has evolved, so have our tokens. Early tokens included physical objects such as coins, documents, and other physical objects. One example of a simple physical object token is the subway token made famous by the New York subway system. This simple token resembled a coin and could be purchased at kiosks and were used to control access to the subway system. Another example of simple physical token for granting access was the early railway token developed in the 19th century for the British railway system. This token was a physical object, such as a coin, that a locomotive engineer was required to have before entering a particular section of the railway. When the train reached the end of the section, the driver left the token at a drop point so it could be to be used by the next train going the other way. Because there was only one token for a given section of railway, the token system helped to ensure that only one train would be on that section of the track at a given time.

The railway token system minimized the likelihood of head on collisions, but this simple token also limited the ability for trains to follow one another along a given section. As such, the system evolved into a token and ticket system. In this system, if a train reached a checkpoint and the token was present, the driver was given a ticket to pass, leaving the token in place in case another train approached that section traveling in the same direction. Safeguards were implemented to ensure that tickets were correctly issued. As technology evolved, the physical token and ticket system evolved to include electronic signaling to control access to sections of the railway.

Another example of tokens to grant access includes charge cards, credit cards and debit cards. Some attribute the 'invention' of credit cards to Edward Bellamy, who described them in his 19th century novel *Looking Backward*. Early cards were reportedly used in the early 20th century United States by fuel companies and by Western Union. By mid century, Diners Club produced a charge card for merchant purchases, which was followed shortly thereafter by American Express. These cards, now ubiquitous in our society, allow customers to make purchases and conduct transactions with relative ease. Early cards were embossed with a customer account number, which was manually transferred to a receipt via a carbon transfer process. Modern cards, or tokens, have evolved to use electronic mechanisms of storing data including, for example, magnetic stripes, RFID tags, and smart card and chip card technologies.

Other examples of tokens include government issued IDs such as driver's licenses and passports. Such tokens can also be used to control access in various forms. For example, a passport can be used to control access to countries and regions. Passports can also be used to access employment and licensing opportunities as a document to prove the holder's citizenship. A driver's license is another form of token, allowing access to driving privileges, and to establishments requiring proof of identity, residency or age. Still other examples of tokens can include bank drafts, stock certificates, currency and other token items relating to finance. Still further token examples can include tokens for physical access and security such as keys, card keys, RF or LC cards, RFID tokens, toll road transponders, and the like.

As these examples illustrate, the use of tokens for various forms of access has gained popularity in various business and industries and has evolved to embrace newly developed technologies. Tokens are not limited to these examples, but can take on various forms and use various instrumentalities and control, govern or arbitrate various forms of access in a variety of different ways. Tokens can be static tokens, where the token data does not change, or dynamic tokens, where the data changes over time or with each token use. An example of a static token is a magnetic stripe bankcard whose data remains the same with each swipe. An example of a dynamic token is a garage door opener employing rolling codes, wherein the code changes with each use. Dynamic tokens are generally thought to be more secure than static tokens because with dynamic tokens, although data might copy from a given use, that data is not valid for subsequent uses.

One downside of token access, however, is the opportunity to defraud the system. For example, stolen or counterfeited tokens are often used to gain unauthorized access. In fact, the Federal Trade Commission reports that credit and charge card fraud costs cardholders and issuers hundreds of millions of dollars each year. As the importance of token access has grown so has the ability of those seeking to defraud the system. These attackers often seek to gain access to valuable data through multiple means including operating system and application security weaknesses and often use sophisticated computer algorithms to attack token security. Such attacks may take the form of repetitive attempts to access the protected system, with each attempt providing additional information. The security of the data is improved when an attacker must make a tremendous number of encryption queries or invest an unreasonable amount of computation time to gain access to encrypted information.

However, simple static tokens such as bankcards for example, typically do not require sophisticated algorithms for attack. Because these tokens are static and the data does not change from use to use, the token can be compromised simply by copying the token data to another token. Indeed, bankcard data is often copied or skimmed by attackers who gain access to the cards and perform an authorized swipe using a card reader that stores information. Cards can also be skimmed by attackers who attach their own counterfeit card reader to a legitimate card reader (such as at an ATM terminal) to skim the data from an unwitting user when he or she uses the ATM terminal.

BRIEF SUMMARY OF EMBODIMENTS OF THE INVENTION

According to various embodiments of the invention, systems and methods for token authentication analyze token data over a plurality of read operations to compute a characteristic master signature for the token. This can be accomplished, for example by analyzing the token data statistically over a period of reads to compute a characteristic signature for the token. Similar techniques can be used to generate a subsequent signature that can be verified against the original characteristic signature to authenticate the token. For example, a signature can be generated on a per use basis and that signature verified against the characteristic signature to validate the token upon use. In other embodiments, the original characteristic signature can be generated in as few as a single swipe. Even in embodiments where the master signature is generated using a single read operation, that signature can be refined using data from one or more subsequent read operations.

In one embodiment, a spatial frequency domain algorithm is used to extract a characteristic signature from variations in data encoding. In some embodiments, the systems and methods are configured to analyze periodic variations in the physical width of bits encoded on the token (such as bits magnetically encoded on a magnetic stripe of bankcard token) to generate a characteristic signature for that token or set of the token data. For example, in the case of a bankcard or other magnetic stripe card, the waveform representing some or all of the bits encoded on a track of the card can be analyzed to determine the approximate physical bit widths. The spatial frequency spectrum of the bit width profile can then be computed and the spatial spectral components can be computed and analyzed. For each spectral component, the total magnitude, vector component magnitudes, phase or any combination thereof can be used to create a signature for the track data.

In one embodiment, the signature includes the series of numbers derived from these spectral characteristics, and it is these numbers that are utilized as the characteristic signature for the token data. It should be noted that the widths do not necessarily need to be spectrally analyzed directly, but that various functions can be applied before or after computation of the spectrum to generate the signature. Processing functions such as frequency transformations, statistical analysis and other processing techniques can be used to generate a signature from the data. For example, spectral-component magnitude information could be used to determine which phases of which components are used as part of a signature because higher magnitude components are more likely to have more consistent phase values. A hybrid approach can be used wherein the component phase values are sent as part of the signature only when a component has a magnitude greater than some minimum threshold.

Systems, methods and apparatus are presented that perform or are configured to perform operations for characterizing a magnetic stripe card based on spatial characteristics of data encoded on the magnetic stripe of the card. In one embodiment, the process includes the operations of using a magnetic stripe reader to read data encoded on the magnetic stripe of the card; calculating spatial characteristics of the data encoded on the card; and determining a characterization signature of the magnetic stripe card using the spatial characteristics, wherein the signature characterizes the magnetic stripe card. In some embodiments, the step of calculating the spatial characteristics comprises identifying relative associations or correlations of spatial characteristics of the data encoded on the magnetic stripe card. For example, the step of calculating the spatial characteristics can include calculating spatial characteristics of the bit waveform of the encoded data in a segment of the data, and computing a function of the bit spatial characteristics for the bits in the segment. As an example, a bit width can be compared to other bit widths or to an average of bit widths, a ratio of bit widths can be computed, bit averages can be compared to other bit averages, median bit widths can be compared to average bit widths, or ratios of bit widths to can be compared to peek widths. In addition, the bit spatial characteristic comprises bit width, a peak shape, a rise time, or a fall time. As another example, calculating spatial characteristics of the data encoded on the card can include steps of parameterizing the waveform of the data encoded on the card to determine spatial features of the waveform and characterizing a subset of the spatial features of the waveform to determine spatial characteristics of the waveform.

In a further embodiment, calculating the spatial characteristics can include calculating an average bit width for a segment of the data; determining a deviation between individual bits in the segment and the average bit width calculated for the segment; and averaging the deviations determined for the individual ones of the bits in the segment to determine an average deviation for the segment. A segment can be all or a part of the data encoded on the magnetic stripe card. Further, the steps of calculating, determining and averaging are performed for a plurality of segments of data encoded on the magnetic stripe, and wherein the fingerprint comprises the average deviations for some or all of the plurality of the segments. The segments can be made up of portions of the data comprising a consecutive plurality of bits, or a plurality of non-consecutive individual bits of the encoded data.

In another embodiment, the steps of calculating, determining and averaging performed for the plurality of segments are performed for a plurality of read operations and wherein the method further comprises the step of determining the consistency of results obtained for each segment across the multiple read operations. Accordingly, the fingerprint can be further determined based on the consistency of the results across the multiple read operations.

In yet another embodiment, calculating the spatial characteristics includes the operations of calculating the bit width for bits of data in a segment of the data; and performing a Fourier transform of the bit widths calculated in the segment. The process can further include a step of discarding unreliable spectral components.

In still another embodiment, the step of calculating the spatial characteristics can include measuring a spatial parameter of data bits encoded on the magnetic stripe for multiple read operations; identifying consistent variations across all bits; and disregarding inconsistent variations for purposes of authenticating the magnetic stripe card. The steps of calculating the spatial characteristics are performed for a plurality of read operations to determine a master characterization based on a plurality of data sets.

Other features and aspects of the invention will become apparent from the following detailed description, taken in conjunction with the accompanying drawings, which illustrate, by way of example, the features in accordance with embodiments of the invention. The summary is not intended to limit the scope of the invention, which is defined solely by the claims attached hereto.

BRIEF DESCRIPTION OF THE DRAWINGS

The present invention, in accordance with one or more various embodiments, is described in detail with reference to the following figures. The drawings are provided for purposes of illustration only and merely depict typical or example embodiments of the invention. These drawings are provided to facilitate the reader's understanding of the invention and shall not be considered limiting of the breadth, scope, or applicability of the invention. It should be noted that for clarity and ease of illustration these drawings are not necessarily made to scale.

The figures are not intended to be exhaustive or to limit the invention to the precise form disclosed. It should be understood that the invention can be practiced with modification and alteration, and that the invention be limited only by the claims and the equivalents thereof.

DETAILED DESCRIPTION OF THE EMBODIMENTS OF THE INVENTION

Figure 1:
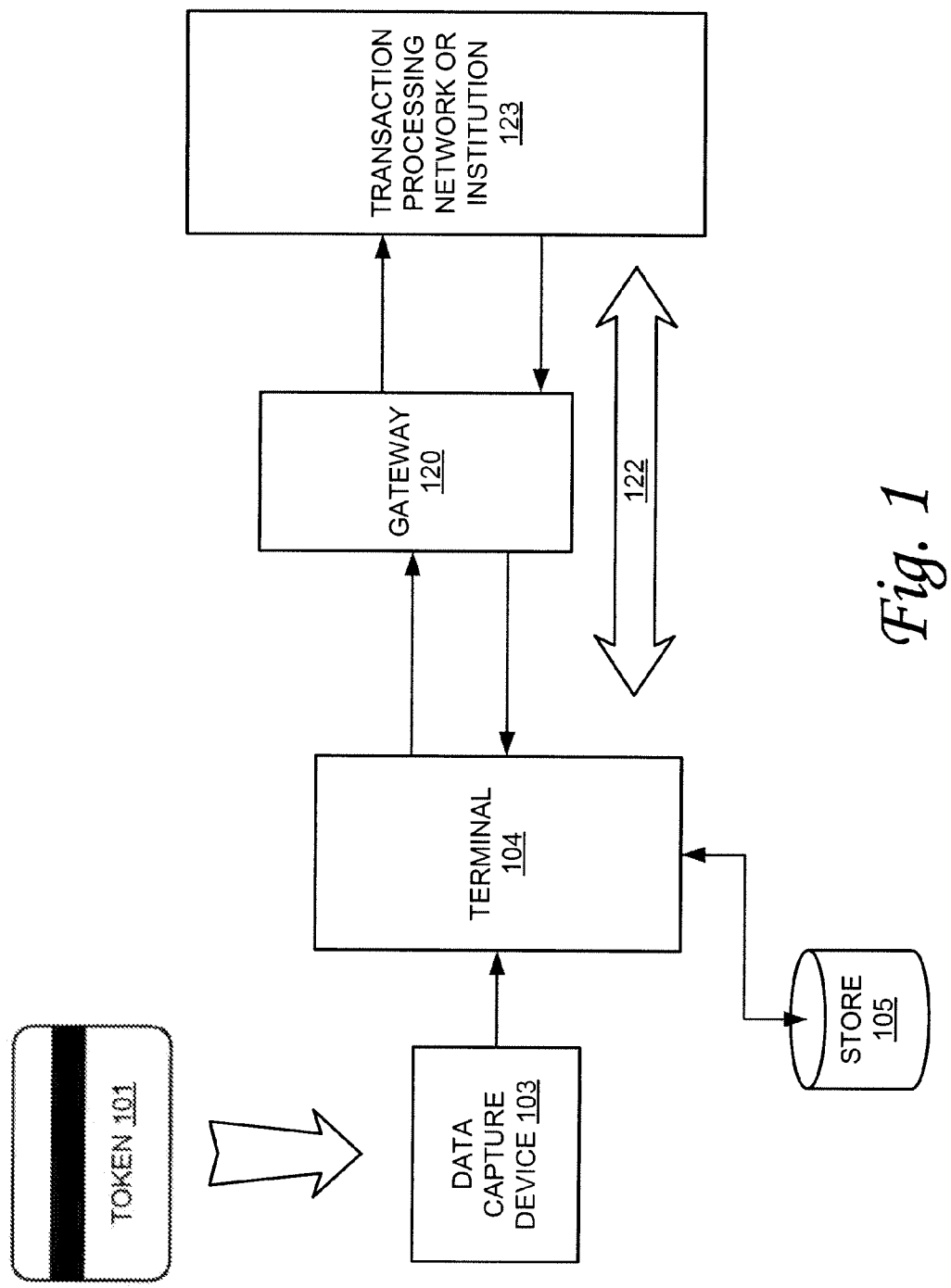
FIG. 1 is a diagram illustrating one example of a transaction network with which the present invention can be implemented.

Various embodiments described herein are directed toward systems and methods for providing token authentication, and systems and methods for generating signatures that can be used for token validation or authentication. Before describing the invention in detail, it is useful to describe an example environment with which the invention can be implemented. One such example is that of a transaction card network including a token used to facilitate purchases or other transactions. FIG. 1 is a diagram illustrating one example of a transaction network within which the present invention can be implemented. Referring now to FIG. 1, an example of transaction network is a token network that can be used to authorize and settle purchases of various goods and services. Illustrative examples of implementations of such a transaction network are the charge card, credit card and debit card transaction networks used to facilitate purchase transactions and banking transactions by and among merchants and other businesses, banks and other financial institutions and individuals. Generally, in such a transaction network, the customer utilizes a charge card, credit card, debit card or other token as a symbol of his or her identity, or as an identification of the account he or she would like to have charged for the transaction. The token is typically accepted by the merchant, the account information read, and used to credit the transaction. Merchants may ask for a driver's license or other form of identification to verify the identity of the purchaser in conjunction with the token issued.

The token data is then sent to the appropriate financial institution or institutions, or other entities for processing. Processing can include, in one or more steps, authorization, approval and settlement of the account. As the example in FIG. 1 illustrates, a token 101 can be used by the customer to facilitate the transaction. As stated, in this example environment, examples of token 101 can include a charge card, debit card, credit card, loyalty card, or other token that can be used to identify such items as the customers, their account, and other relevant information. As a further example, a card such as a credit or debit card can include various forms of technology to store data, such as a magnetic stripe technology, processor or smart card technology, bar code technology or other technology used to encode account number or other identification or information onto the token. As such, a properly encoded token can include various forms of information relating to the purchaser such as, for example, the identity of the purchaser, information associated with the purchaser's account, the issuing bank or other financial institution, the expiration date, and so on.

As only one example of a token 101, a credit card can be used with a conventional magnetic stripe included on one side thereof. Conventional magnetic stripes can include three tracks of data. Further to this example, the ISO/IEC standard 7811, which is used by banks, specifies: that track one is 210 bits per inch (bpi), and holds 79 six-bit plus parity bit read-only characters; track two is 75 bpi, and holds 40 four-bit plus parity bit characters; and track three is 210 bpi, and holds 107 four-bit plus parity bit characters. Most conventional credit cards use tracks one and two for financial transactions. Track three is a read/write track (that includes an encrypted PIN, country code, currency units, amount authorized), but its usage is not standardized among banks.

In a conventional credit card token, the information on track one is contained in two formats. Format A, is reserved for proprietary use of the card issuer. Format B includes the following:
  Start sentinel—1 character
  Format code="B"—1 character (alpha only)
  Primary account number—up to 19 characters
  Separator—1 character
  Country code—3 characters
  Name—2-26 characters
  Separator—1 character
  Expiration date or separator—4 characters or 1 character
  Discretionary data—enough characters to fill up to the maximum record length (79 characters total)
  End sentinel—1 character
  Longitudinal Redundancy Check (LRC), a form of computed check character—1 character
The format for track two can be implemented as follows:
  Start sentinel—1 character
  Primary account number—up to 19 characters
  Separator—1 character
  Country code—3 characters
  Expiration date or separator—4 characters or 1 character
  Discretionary data—enough characters to fill up to the maximum record length (40 characters total)
  LRC—1 character Although a credit card with magnetic stripe data is only one example of a token that can be used in this and other environments, this example environment is often described herein in terms of a credit card implementation for clarity and for ease of discussion.

Upon entering into a transaction, a merchant may ask the customer to present his or her form of payment, which in this example is the credit card. The customer presents the token 101 (e.g., credit card) to the merchant for use in the transaction terminal 104. In one embodiment, the credit card can be swiped by a magnetic stripe reader or otherwise placed to be read by the data capture device 103. In the current example where a credit card utilizing a magnetic stripe is the token 101, data capture device 103 can include any of a variety of forms of magnetic stripe readers to extract the data from the credit card. Other forms of data capture devices 103, or readers, may also be used to obtain the information from token 101. For example, bar code scanners, smart card readers, RFID readers, near-field devices, and other mechanisms can be used to obtain some or all of the data associated with token 101 and used for the transaction.

The data capture device is in communicative contact with a terminal 104, which can include any of a number of terminals including, for example, a point of sale terminal, point of access terminal, an authorization station, automated teller machine, computer terminal, personal computer, work stations, cell phone, PDA, handheld computing device and other data entry devices. Although in many applications the data capture device 103 is physically separated, but in communicative contact with, the terminal 104, in other environments these items can be in the same housing or in integrated housings.

Continuing with the credit card example, the customer or cashier can swipe the customer's credit card using the card-swipe device, which reads the card data and forwards it to the cashier's cash register or other terminal 104. In one embodiment, the magnetic stripe reader or other data capture device 103 is physically separated, but in communicative contact with, the terminal 104. In other environments, these items can be in the same housing or in integrated housings. For example, in current implementations in retail centers, a magnetic stripe reader may be placed on a counter in proximity to a customer, and electronically coupled to the cash register terminal. The cash register terminal may also have a magnetic stripe reader for the sales clerk's use.

The customer may be asked to present a form of ID to verify his or her identity as imprinted on the token 101. For other transactions such as debit card transactions, the user may be required to key in a PIN or other authentication entry.

Continuing with the current credit card example, the terminal 104 can be configured to print out a receipt (or may display a signature page on a display screen) and the customer may be required to sign for his or her purchases, thus providing another level of authentication for the purchase. In some environments, terminal 104 can be configured to store a record of the transaction for recordkeeping and reporting purposes. Further, in some environments, a record of the transaction may be kept for later account settlement.

Typically, before the transaction is approved, terminal 104 seeks authorization from one or more entities in a transaction processing network 123. For example, the merchant may seek approval from the acquiring bank, the issuing bank, a clearing house, or other entity that may be used to approve such transactions. Thus, depending on the token type, institutions involved and other factors, the transaction processing network 123 can be a single entity or institution, or it can be a plurality of entities or institutions. As a further example, in one embodiment, transaction processing network may include one or more processors or clearing houses to clear transactions on behalf of issuing banks and acquiring banks. The transaction processing network also include those issuing banks and acquiring banks. For example, one or more entities such as Global Payments, Visa, American Express, and so on, might be a part of transaction processing network. Each of these entities may have one or more processing servers to handle transactions.

As illustrated in FIG. 1, a gateway 120 can be included to facilitate routing of transactions, authorizations and settlements to and from the appropriate entity or entities within the transaction processing network 123. For example, where a merchant accepts credit cards from numerous different institutions, the gateway can use the BIN (Bank Identification Number) obtained from token 101 and passed to gateway 120 to route the transaction to the institution(s) associated with the given BIN. As illustrated by flow arrow 122, not all transactions are necessarily routed through a gateway 120. Transactions may take other paths to the appropriate entity or entities in the transaction processing network 123. Additionally, the term gateway as used herein is not restricted to conventional gateway applications, but is broad enough to encompass any server or computing system configured to perform any or all of the described functionality. The term gateway is used for convenience only.

Although transaction-processing network 123 is illustrated using only one block in the example block diagram environment of FIG. 1, this block can represent a single entity to which the transaction is routed for authorization or settlement, or a network of entities that may be involved with authorization and settlement. Communications among the various components in the example environment can be wired or wireless transmissions using a variety of communication technologies formats and protocols as may be deemed appropriate for the given environment. As one example, the currently available credit card processing network and protocol structure can be utilized as the environment with which embodiments of the invention can be implemented. Various features and functions of the invention can be implemented within current or legacy transaction processing networks to provide enhanced security.

Having thus described an example environment, the present invention is from time-to-time described herein in terms of this example environment. Description in terms of this environment is provided to allow the various features and embodiments of the invention to be portrayed in the context of an exemplary application. After reading this description, it will become apparent to one of ordinary skill in the art how the invention can be implemented in different and alternative environments, including environments where it is necessary or desirable to encrypt data for transmission or storage.

In various embodiments of the invention, a system and method for token authentication analyzes token data over one or more read operations and analyzes the token data to compute a characteristic signature for the token. Spatial characteristics of the token data can be used to generate a signature that characterizes the token. Bit widths, rise times, bit profiles and other characteristics can be measured to generate a signature. In one embodiment, a frequency domain algorithm is used to extract a characteristic signature from variations in data encoding. Accordingly, the system and method can be configured to analyze periodic variations in the physical width of bits encoded on the token (such as bits encoded on a magnetic stripe of the token) to generate a characteristic signature for that token or set of the token data. For example, in the case of a bankcard or other magnetic stripe card, some or all of the bits encoded on a track of the magnetic stripe card can be analyzed to determine the approximate physical widths. The spatial frequency spectrum of the bit width profile can then be computed and the spectral components can be analyzed. For each component, the total magnitude, vector component magnitudes, phase or any combination thereof can be used to create a signature for the track data.

In one embodiment, the signature includes the series of numbers derived from these spectral characteristics. It should be noted that the widths or other spatial characteristics do not necessarily need to be spectrally analyzed directly, but that pre-processing functions can be applied before the spectrum is computed. Spectral magnitude information could be used to determine which phases of which spectral components are used as part of a signature because higher magnitude spectral components are more likely to have more consistent phase values. A hybrid approach can be used wherein the phase values are sent as part of the signature only when a spectral component has a magnitude greater than some minimum threshold. In addition to or in place of frequency transformations, statistical analysis and other processing techniques can be used to generate a signature from the data.

As noted above, in one embodiment the bit widths of the data are analyzed to compute the spectrum. However, these bit widths do not need to be analyzed in sequence or in groups of sequential bits. In some embodiments, the ordering of the bits can be arbitrary, but it is preferable that the ordering is the same each time the signature is generated such that the signatures can be expected to be consistent. In addition, spectral components in the spatial frequency spectrum may be used in any order to generate the signature. The raw magnitude, phase or other parameter values of one or more spectral components may be passed as a signature or further processing of the spectral components may be performed in an attempt to include more useful information into smaller packets of data.

As also noted above, in some embodiments, the master signature is generated using data from a plurality of read operations. When multiple data gathering events are used to generate a composite signature, the level of correlation or consistency of the data elements from one read operation to the next can be used as a factor in weighting the data elements used to generate a composite signature or to determine whether to discard any data elements when generating the composite signature. For example, in one embodiment, the spatial characteristics can be measured and the measurement repeated multiple times to determine consistency. The consistency can be used to generate a weighting factor for each element and the weighting factor assigned to its corresponding element for the authentication operations. Accordingly, in one embodiment less consistent elements can be given less weight as they are applied to the authentication process and more consistent elements can be given greater weight.

In additional embodiments, the master characterization can be generated in a single swipe, or read operation, without regard to consistency or correlation among multiple data read events. In addition, subsequent read operations can be used to update the originally generated signature regardless of whether the originally generated signature was generated using a single data set or multiple data sets from multiple read operations. For example, in one application a bankcard can be issued without an initial master characterization generated in advance of issuance. Then, when the card is swiped during use (for example, at the first use or during subsequent uses), the data gathered from that swipe is used to generate the master signature. Accordingly, the token need not be characterized as part of the manufacturing process and can be characterized to obtain a master signature once it is put into use. Further to this example, upon a second use of the bankcard, a signature can be generated based on the second swipe and that signature compared to signature generated on the first swipe to validate the card. Additionally, if the card is validated, data from the first and second swipes can be used to generate the master signature. This process can continue as the card is swiped such that a master signature for a given swipe can be derived from all of the previous swipes of the card, or from a subset of those previous swipes.

As the number of swipes increases, the confidence in the master signature can also increase statistically such that the comparison is theoretically more stringent with each new swipe. For example, the multiple data sets for each element can be averaged together to generate a single factor for each element and, in some environments, the averaging over multiple reads can cancel out the effects of noise, environment or other phenomenon. Additionally, the inclusion of a weighting factor based on consistency can strengthen the characterization and authentication by diminishing the effect of less reliable data elements while placing greater emphasis on the more reliable ones.

Figure 2:
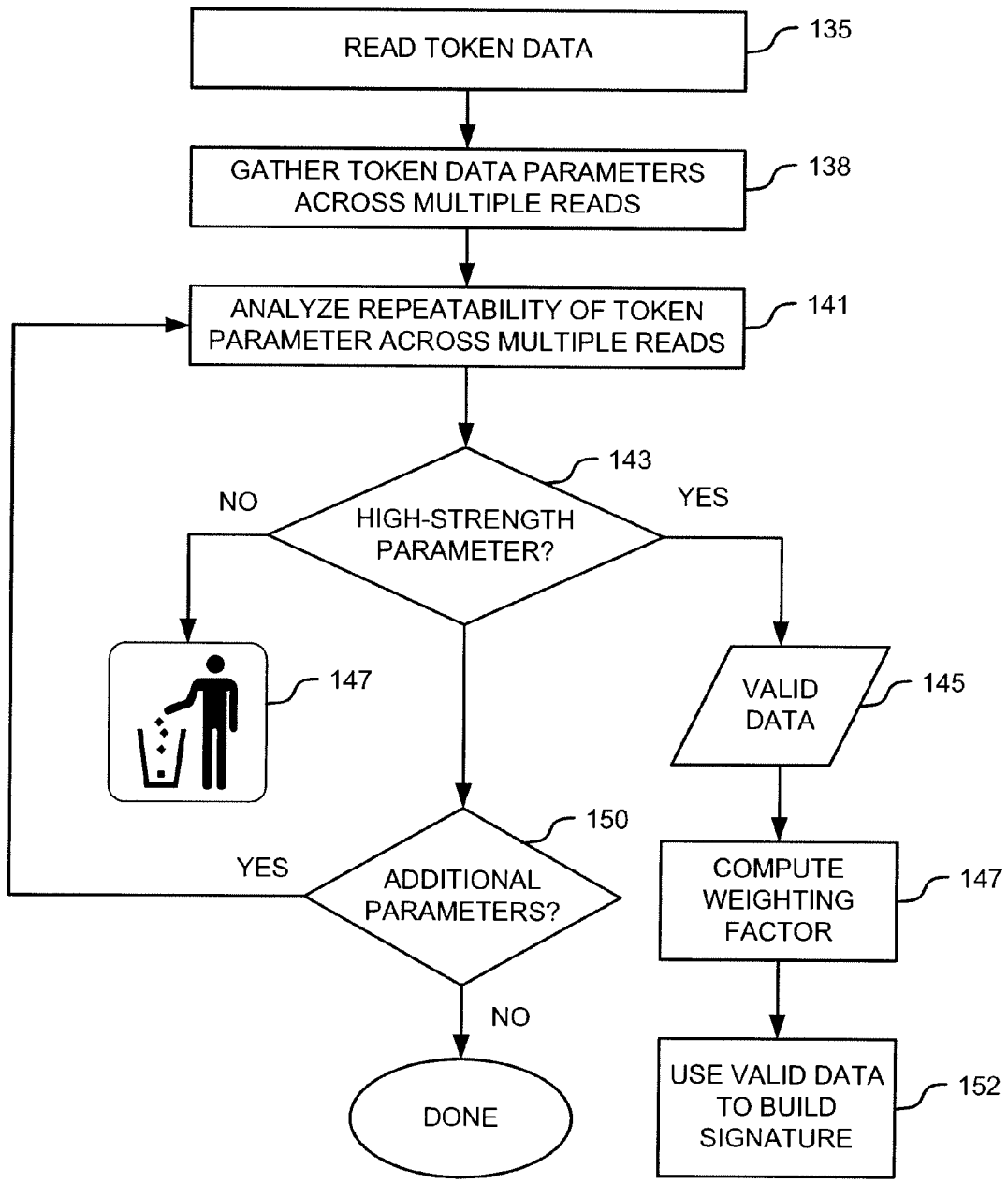
FIG. 2 is a diagram illustrating an example process for generating a signature in accordance with one embodiment of the invention.

FIG. 2 is a diagram illustrating an example process for generating a signature in accordance with one embodiment of the invention. For ease of description, this and other embodiments described herein are described in terms of the example environment of a magnetic stripe card. It will become apparent to one of ordinary skill in the art after reading this description how these embodiments extend to other forms of token and token data. Referring now to FIG. 2, in step 135 the token data is read. For example, in the case of a magnetic-stripe card, a magnetic stripe reader is used to read the card. Preferably, for generation of the original characteristic signature, the token data is read and stored across multiple read operations such that statistical analysis such as that described below can be performed. This can be implemented to allow the consistency of the data parameters to be evaluated and considered across multiple uses of the token.

In step 138 and 141 of this example embodiment, the token data is read multiple times and the strength of one or more parameters of the token data is determined to evaluate the veracity of the data parameters. In one embodiment, variations across multiple reads of the token data are identified and analyzed. For example, various parameters of the token data are analyzed and consistency of the data across multiple read operations is used as a metric to determine whether or not to use that data in generating the token signature or to determine weighting factors to assign to data elements used in the characterization. Accordingly, for data that is used, a weighting factor can also be assigned to that data, which, in one embodiment, can be performed in step 147.

As stated above, in one implementation, the bit widths of the data bits in the token data set are compared or statistically analyzed across the multiple sets of data. The multiple data sets can be done using the same token reader or using multiple different token readers to allow effects of instrument variations to be averaged out of the characterization. The systems and methods described herein can be implemented to look at the level of correlation of the data from swipe to swipe of the magnetic stripe data. For example, data sets from multiple swipes having high levels of correlation amongst one another can be retained, while data sets from one or more swipes having a lower level of correlation with the other swipes can be discarded or ignored. Accordingly, such embodiments can pay more attention or give greater weight to consistent or highly correlated data and ignore or give lesser weight to uncorrelated, less reliable, data. In one embodiment, the data set is built to include the elements regardless of their weight or consistency, and that metric is applied at the authentication stage. In other embodiments, the consistency or reliability can be used to discard data elements for signature generation.

As a further example, the bit widths of the data bits in the card track data can be measured across multiple swipes, and the consistency of the measured bit width can be used to determine whether the system is obtaining valid data for each bit. In cases where the bit-width measurement might be faulty—for example, masked by noise—the bit width measurement for that bit from one swipe to the next will have high levels of variation or inconsistency. In other words, the standard deviation of the dataset might be high. Then, for authentication process, the bit width information itself is collected from the presented token and the measured bit width compared against the expected value or average value to determine the signature or authenticity of the card. In yet a further example, peak rise/fall times, bit slopes or other waveform characteristics can be measured and used to form the signature. As these and the further examples described below illustrate, the systems and methods are not limited to measuring and comparing bit widths but can rely on or utilize other data parameters to characterize the token data.

Therefore, in step 143 if the level of correlation of an investigated parameter across the multiple data sets is below a predetermined threshold, that parameter can be discarded. However, where there is a sufficiently high degree of correlation, that parameter is valid data 145 and can be used to build the signature for the token in step 152. In some embodiments, the unreliable elements can actually be discarded, and the characterization assembled using the remaining elements. In other embodiments, all the elements can be retained and weighting factors, semaphores or other techniques can be used to affect the utilization of those elements in the authentication process.

As indicated at step 150, the process can be repeated for a plurality of data parameters to build the signature using a sufficiently large data set. The systems and methods described herein do not require selection of a particular threshold of correlation of a parameter among the data sets or a minimum number of parameters. These metrics can vary from application to application and can be chosen for a particular application based on the realities of application such as, for example, the repeatability of the measurements of token data, the amount of data to be authenticated, and the quality of the signature desired by the system implementer.

As the example of FIG. 2 illustrates, the data can be checked for consistency and then threshold checked to determine a weighting or to determine whether it is reliable enough to be used as a component for the signature. In the example of FIG. 2, the threshold check is done at step 143 and then a weighting factor is created for the valid data elements at step 147. In another example, the weighting could be performed based on consistency and the threshold check (i.e., step 143) could be performed based on the weighting. The example of FIG. 2 depicts an embodiment in which the signature can be built on the fly while the algorithm returns via step 150 to obtain additional parameters. In another embodiment, the signature can be computed after all the parameters are obtained. Again, data elements need not actually be discarded as this example illustrates, but can be weighted or flagged for the authentication process. As these alternatives serve to illustrate, the example embodiments described herein are merely examples, and variations to those examples are within the spirit and scope of the embodiments described herein.

To help explain the above-described process further, consider another example in which data is gathered from a plurality of card swipes from a magnetic stripe reader, and a Fourier transform is performed on the data so that the data can be analyzed in the frequency domain. For example, in one application, the data from a plurality of card swipes is analyzed in the frequency domain and, in particular, the phase of each spectral component of the data is compared with the phase of the corresponding component in the other data sets. If, for example, after ten or twenty card swipes (or other quantity of swipes) all of the spectral components are consistent except for a few (for example, the fifth and twelfth spectral components), those spectral components that are returning inconsistent or uncorrelated data can be discarded or assigned low or zero weights, and the more highly correlated spectral components assigned higher weights for the signature. For example, where the Fourier transform indicates that the magnitude level for a given spectral component is so small that noise is basically dominating, making the phase look random, that component can be deemed to be uncorrelated, and of insufficient strength to be used in reliably authenticating a token.

Another example evaluates the magnitude of various spectral components, and determines whether to use the phase measurements based on the magnitudes. If the magnitude level is high enough, the phase can be deemed to be reliable. In this and other embodiments, determination can be done using even as few as a single swipe. An exception to this can be in situations where the magnitude of the spectral component is very small, because small spectral components typically require higher accuracy.

With magnetic stripe data, the phase of most spectral components tends to be somewhat repeatable from one swipe to another swipe of the same card. Swipes of different cards generally produce significantly different results. An exception to this can be where the magnitude of the spectral component is very small because the spectral components require higher accuracy and less noise to produce repeatable results. Accordingly, one approach either passes the phase of only the highest magnitude spectral components or passes the magnitude instead of the phase for low magnitude spectral components or does some combination of both.

It should be noted that the Fourier transform can be used to look for and identify periodic characteristics in the data such as bit widths, bit width variations, and so on. The Fourier transform can be used to process token data and to compute a corresponding spatial Fourier spectrum, where each bin of the spectrum corresponds to elements of the signature. For example, the phase or magnitude of the various spectral components can make up elements of the signature. As such, periodic characteristics in the bit-width profile can be evaluated. Although the Fourier transform is described in this document as one example of spectral analysis, any type of frequency domain analysis (Fourier transform, DCT, wavelet, filter banks, autocorrelation, etc.) could be used to obtain a signature based on the spatial frequency characteristics of the encoded data. In addition, a hybrid approach can be implemented that uses both a frequency transformation and statistical analysis to characterize both the spectral and spatial properties of the encoded data.

In some embodiments, the multiple read operations are performed using the same token with the same token reader. In other embodiments, multiple read operations can be performed across a plurality of different token readers. In addition, the analysis can be across an entire track of data (or other unit of data, depending on the token-type), or the track data can be broken up into smaller segments for analysis and comparison. For example, track data can be broken into segments of one or more bits in length. The segments need not be analyzed in any particular order, but for valid correlations, it is desirable that the same segment delineations be used across multiple read operations and the each segment be correlated against its corresponding segment in the other data sets.

In some embodiments, methodologies for generating a master signature can be done initially when the bankcard or other token is created. For example, upon creation of a bankcard, one or more swipes can be made using one or more card reader terminals and the data analyzed to generate an initial characteristic signature, or master signature, for the token. This initial signature can be used as the baseline or master signature against which the card is authenticated for subsequent read operations. Accordingly, a bankcard can be created by the manufacturer, the data encoded thereon, and a master signature generated based on one or more swipes of the card. When the cardholder uses the card, for example, in a point-of-sale transaction, the width of the bits or other spatial characteristics or metrics are used to generate a usage signature, which is compared against the master signature to authenticate or check the authenticity of the card. If the per-use signature of the presented token satisfies the signature correlation criteria, the master signature stored for the original token, the presented token can be said to be authentic.

As this illustrates, in addition to generating a master signature for the token, systems and methods described herein can be used to generate a usage or per-use signature to authenticate a subsequent use of a token against its master signature. For example, systems and methods described herein can be used to generate a master signature for a bankcard, and this generation can occur upon manufacture or otherwise prior to initial use of the card, or it can be created or be updated during card usage. Likewise, the systems and methods described herein can be applied upon card usage, such as at the point-of-sale, and the signature generated at that time of use can be presented to authenticate the card to determine its authenticity.

In embodiments, a token writer used to create the tokens can be characterized to generate a master signature. Then, every token created by that writer should possess similar encoding characteristics, at least within the range of variation allowed by the physical characteristics of the token. These characteristics can include bit width errors, inter-symbol modulation, or any other non-ideality in the writer that could manifest itself as identifiable signature on cards created by that writer.

Accordingly, in some embodiments, the master signature can be stored in a centralized or otherwise accessible location, such as in the transaction processing network. As a further example, a fraud detection module or system can be implemented in gateways or other shared locations in the network, or individual entities such as issuing banks can implement a fraud detection system to authenticate the cards. For transactions, the per-use generated signature can be compared (for example, by the fraud detection module) against the master signature as part of the transaction process. The per-use signature generated at the time of sale can be generated at the point-of-sale terminal and the signature itself sent to the transaction processing network for authentication. Alternatively, the raw data used to generate the per-use authenticating signature can be sent to the transaction network for signature generation and authentication against the master signature.

In another embodiment as indicated above, the characteristic master signature can be generated or updated across multiple reads that are performed as a bankcard or other token is applied in normal use. For example, as a cardholder uses his or her bankcard for multiple point-of-sale transactions, the token data metrics (for example the bit widths) can be collected across these multiple transactions and used to generate a signature in accordance with the systems and methods described herein. This data can be sent to a fraud detection facility or other location (for example, in the transaction network) to be used to generate or update the official signature.

Regardless of whether the master signature is generated through plurality of read operations at the time of manufacture or across multiple read operations during use, the token signature can be updated and change over time. For example, environmental conditions such as changes in temperature can cause the width of the bits encoded on the card to change. Likewise, mechanical interaction of the magnetic stripe with the read head across multiple operations can cause some displacement of the magnetic particles sufficient to change the signature of the card to a certain degree. In addition, variations that occur over the life of the card may change the level of correlation in the parameters used to generate the signature. As such, the components that make up the signature may change over time. For example, in an embodiment that uses a Fourier transform to look at the phase of the spectral components, over time highly correlated component may become uncorrelated in a previously uncorrelated component may become highly correlated. Accordingly, the master signature can be maintained and updated using data from multiple swipes over the life of the token.

As these examples illustrate, in some applications, systems and methods described herein for generating and authenticating a signature can be applied or reapplied over the lifetime of token usage. Accordingly, the master signature against which the token is authenticated can be recalculated from time to time and indeed may change over time.

Ideally, it would be ideal to have a system where swipes of the same card always reproduce exactly the same signature values, and swipes of different cards produce values that are random relative to each other. Likewise, a system that has these values bounded to a finite range by maximum and minimum values and values uniformly distributed across a range can be advantageous. Having a finite range can also be beneficial in that the values can be quantified into a predetermined number of levels within that range. In a frequency domain embodiment using the phase, for example, the phase can help to meet this criteria because the phase is bounded to a finite range between $-180°$ and $+180°$. In addition, low magnitude spectral components can be managed (either using selective spectral components or using a phase/magnitude approach) helping to meet the reproducibility requirement.

Figure 3:
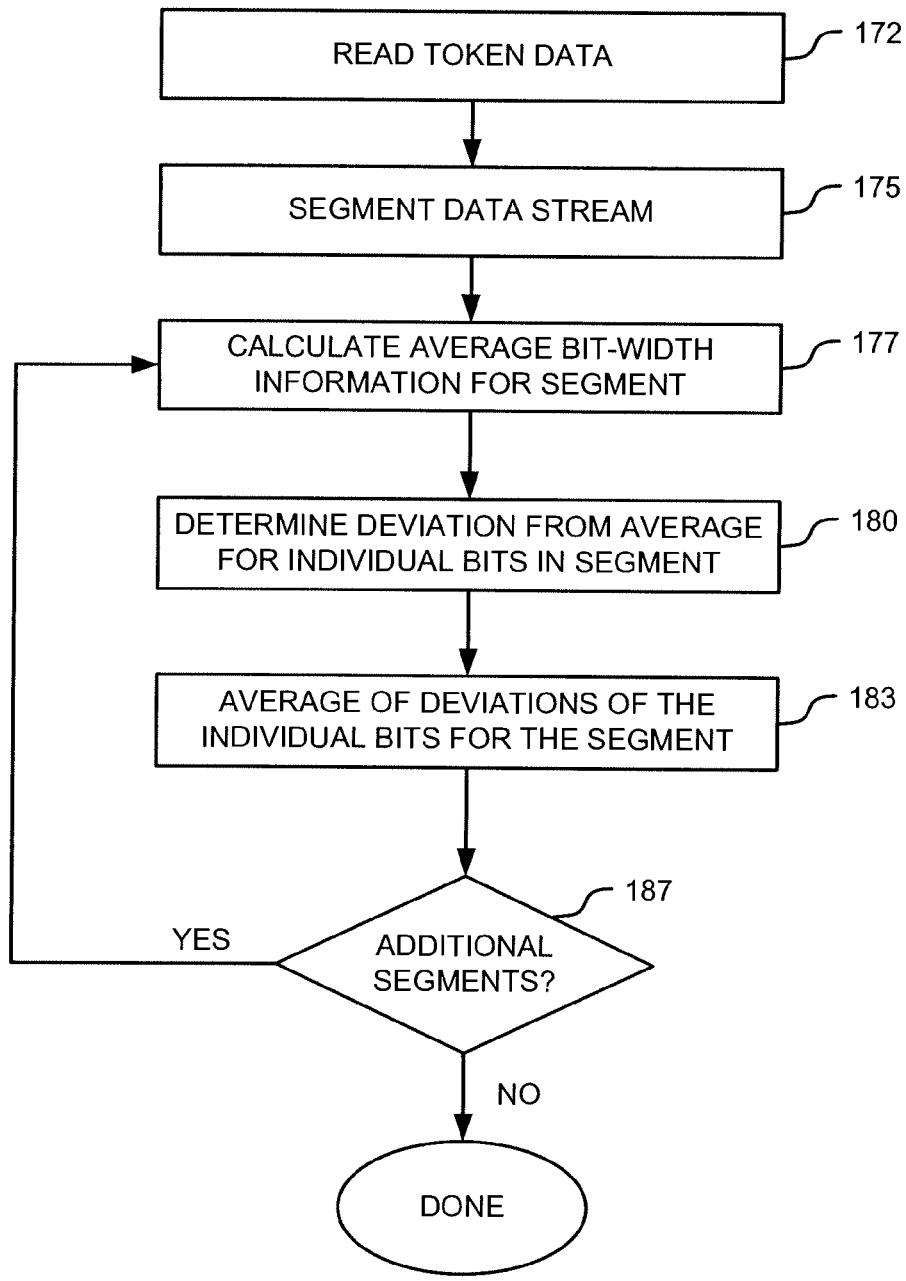
FIG. 3 is an operational flow diagram illustrating an example process for gathering token data for signature generation or verification in accordance to one embodiment of the invention.

FIG. 3 is an operational flow diagram illustrating an example process for gathering and operating on token data for signature generation or verification in accordance to one embodiment of the invention. Referring now to FIG. 3, in step 172, the token data is read. For example, in the case of a bankcard or other magnetic stripe card, the card can be read using a magnetic-stripe reader. In step 175, the data that is read is segmented into a plurality of data strings. For example, in the case of the bankcard, a given track or tracks of data can be broken up into a number of segments such as 4, 6, 8 or other quantity of segments of one or more bits in length. In cases where the data is broken up into the segments, the data can be processed on a segment-by-segment basis as described below.

After the data is read, the waveform of the data encoded on the card can be parameterized to determine spatial features of the waveform and a subset of some or all of the spatial features can be characterized to determine spatial characteristics of the waveform. In step 177, bit-width information is calculated for a first segment. In one embodiment, the width of each bit in the data segment is measured and these measurements are used to calculate the average bit width for that segment. For example, in the case of a magnetic stripe card, a peak detector can be used to detect bit width and then the average of the bit widths is determined.

In step 180, each bit width for the data bits in the segment are compared to the average width for that segment computed in step 177 to determine the deviation or absolute distance of each bit from the average. In one embodiment, the deviation can be computed as a physical distance such as, for example, the absolute value of the difference in bit width. In another embodiment, the deviation can be determined as simply greater than or less than the average bit width. In a further embodiment, the deviation can be computed and used as a percentage of or a ratio to the average bit width (e.g., x.x % deviation from the average). In yet another embodiment, the deviations can be quantized into buckets such as, for example within 10%, between 10% and 20%, and so on. Computing the deviation as a percentage of the average can be used in some embodiments to allow, for example, effects of thermal expansion or contraction to be canceled out. This can be used to help eliminate false negatives when the bit widths of an authentic card change across the card or segment such as might result from thermal variations.

Note that in embodiments that use an over/under approach such as to simply note whether a bit width is greater than or less than the average, less bandwidth can be consumed than embodiments that use a finer resolution such as x.xx % greater than or less than the average—or even x.xx % from average. Therefore, this can be a consideration in system implementation. Also, it is possible to use a hybrid approach in various implementations. For example, in one implementation, the master signature might be generated using a higher resolution mode, and the ongoing per-use signatures generated and sent using the lower resolution mode. Accordingly, in such an implementation, for ongoing uses, the lower resolution data set can be transmitted to a server for authentication.

In some embodiments, the bit width deviation can be used for the signature elements. However, in another embodiment, as shown in the example of FIG. 3, at step 183, the deviations computed for each bit in step 180 are averaged. This yields the average deviation from the average bit width for that segment. This average value becomes the first component of the signature for the token.

As illustrated by step 187, this process of determining an average bit width for a segment, determining the deviations for the individual bits in that segment from the average, and determining the average of deviations is repeated for each segment used, and the result for each segment becomes part of the signature for the token. Although a segment can theoretically be as small as a single bit, this illustrates that either a segment-by-segment approach or a bit-by-bit approach can be implemented. In more general terms, the process of determine spatial features of the waveform and characterizing a subset of some or all of the spatial features of the waveform to determine spatial characteristics of the waveform, can be done on a segment-by-segment basis for multiple segments of magnetic stripe data.

In the example process described with reference to FIG. 3, the average deviations are collected and used as the card signature. In instances where an initial card signature is being generated against which subsequent signatures will be authenticated, it may be desirable to generate this initial card signature over multiple data sets such as, for example, described above with reference to FIG. 2. Accordingly, the process described respect to FIG. 3 can, in some embodiments, be repeated over multiple card swipes (or token reads). As also described above, correlation or consistency of the individual data sets among multiple read operations can be used as a basis for assigning a weighting to the data elements or for keeping or discarding various data elements. For example, where the average of the deviations computed for a given segment is inconsistent for that segment across multiple reads, that average might be discarded or it might be given a lesser weight in the overall signature. Accordingly, if a segment is not used in generating the master signature for a token, that segment does not need to be computed to authenticate subsequent token uses.

In instances where data from a particular segment is not used in the signature or flagged for non-use in authentication, a threshold of correlation or consistency can be established as a metric for determining whether the data should be used. The higher the threshold, generally speaking, the greater level of certainty can be gained in token authentication. However, too high a threshold can result in not enough data points for full signature data set. Therefore, noise and other factors that can result in inconsistency in the system should be considered when setting the threshold. Statistical analysis can be used to determine threshold settings that can be used to achieve desired fraud detection capabilities.

Where a weighting scheme is used, weightings can be assigned based on the statistical consistency of the value for a given segment. For example, weightings can be assigned in a manner proportional to the level of consistency among the datasets such that data segments that have higher levels of consistency or correlation from one data set to the next are given a higher rating and data segments have lower levels of consistency are given a lower rating. The proportionality between the rating and consistency can be linear or nonlinear and a threshold algorithm could be used to discard data sets below a certain level of consistency.

Note that in one embodiment, the weighting is assigned based on statistical consistency of the data across the data sets obtained. For example, in a frequency domain or spectral analysis, the phase components can be weighted based on their magnitudes. In another example, where the data measurements are returning data sets with a small standard deviation, this indicates a high level of consistency. In other words, if the results are consistent among the multiple swipes, this gives a higher level of certainty that the data used to generate the signature, or this element of the signature, is valid data and is data that should be highly repeatable and therefore expected upon subsequent uses of the card when it is validated at the point-of-sale. Accordingly, a high level of repeatability even where the deviation is higher than expected can lead to higher levels of certainty in the authentication process.

Although not illustrated in FIG. 3, a scaling factor can be applied to the data set before the signature is transferred. For example, in embodiments where average deviations are used to generate the signature, a scaling factor can be applied to normalize the data set to the maximum average deviation thereby making more efficient use of the bandwidth used to transmit the signature from a source to its ultimate destination. This can be implemented to allow the system to utilize the full range of the data size.

Data can be collected to indicate which spectral components are used to generate the signature so that verification can be performed using the same spectral components. For example, in one embodiment, a value can be used to represent an index into a lookup table containing spectral component groupings. This index can be used to tell a fraud detection system for authentication system which spectral components were used in the signature so that that system can use only those spectral components when authenticating the comparison signature.

Another technique for specifying which spectral components are used in a signature is to encode a delta value into the signature indicating how far away the next spectral component is. As with the previous method, the fraud detection system can keep a database of components that are received during use. In addition, a list of spectral components used to generate a signature can also be used by a fraud detection system to determine the likelihood of certain spectral components being used such that the receipt of unlikely or unused spectral components might indicate an attempt at fraud.

Figure 4:
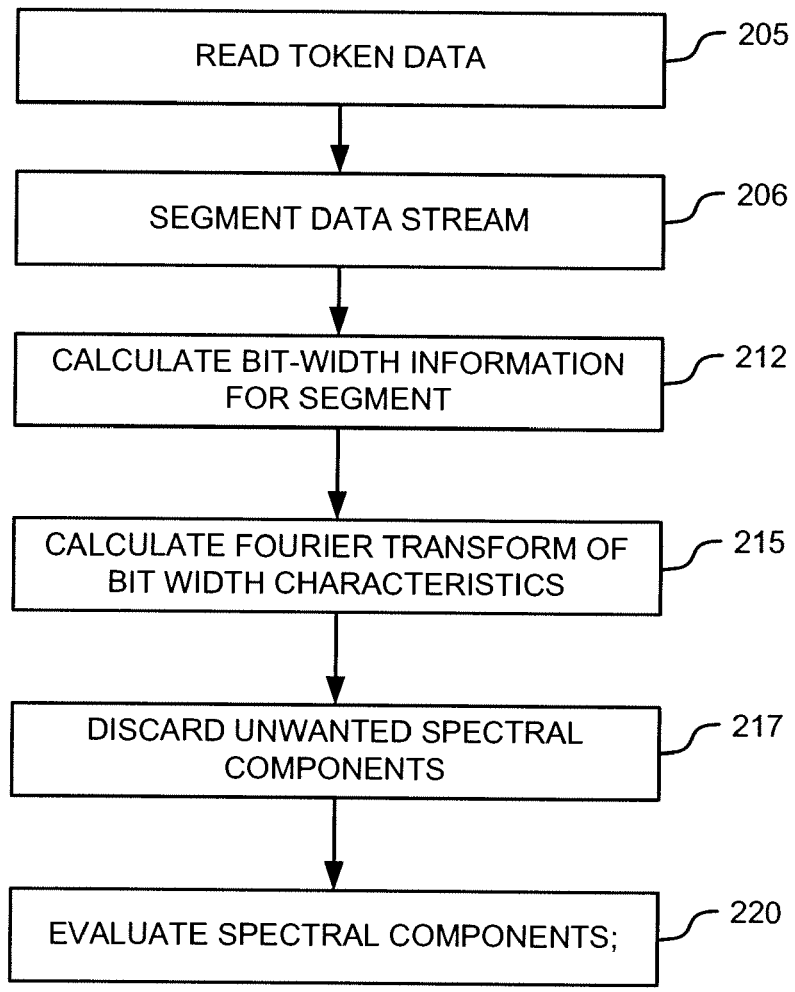
FIG. 4 is a diagram illustrating another sample process for signature generation in accordance with one embodiment of the invention.

FIG. 4 is a diagram illustrating another sample process for signature generation in accordance with one embodiment of the invention. FIG. 4 is similar to FIG. 3, however, whereas FIG. 3 presents an embodiment wherein deviations from an average bit widths are calculated, FIG. 4 presents an embodiment where a Fourier transform of the spatial features is used to determine characteristics for signature generation. Referring now to FIG. 4, in step 205, the token data is read and, in the illustrated example, the data stream is segmented into a plurality of segments at step 206. The spatial characteristics for a first segment are extracted at step 212. Note that as mentioned below, the data does not need to be divided and the process can be performed for an entire collected data set.

In step 215, a Fourier transform of the bit widths measured for that segment is calculated. This recasts the bit width information into the frequency domain to enable spectral characterization of the data in that segment. The DC component of the resulting spectrum can be discarded in one embodiment. In some embodiments, the bit widths themselves are collected and used in the Fourier transform. In an alternative embodiment, the error in the bit widths (i.e. the deviation from the measured bit widths as compared to the ideal bit widths) can be used with a Fourier transform. For example, assume a token where the bit with supposed to be 0.014 inches wide, but the measured bit widths is 0.015 inches. In this example, the error or deviation, which is 0.001 inches would be used for the Fourier transform. Accordingly, the errors in bit width are calculated rather than the actual bit widths themselves. In other words, the bit-width information using this process can be either relative or absolute.

At step 217 the spectral components are analyzed and unwanted spectral components are discarded or given a lower weight. Spectral components that are deemed to be unreliable—for example spectral components that indicate that data is not repeatable from swipe to swipe—are spectral components that are considered unwanted. At step 220, the relevant spectral components are evaluated to generate the signature. As with the embodiments described above, the process of FIG. 4 can be use across multiple swipes or token reads. Indeed, these multiple reads are what allow the system in step 217 to determine which data are the unwanted or non-informative data items (e.g., which are uncorrelated or varying to the extent that it is unreliable).

In the embodiment illustrated in FIG. 4, the data stream is broken into segments before the Fourier transform is computed. For example, in one embodiment, the data can be segmented into a base 2 number (e.g., 64) for a more efficient Fourier transform. However, in another embodiment, a discrete time Fourier transform can be computed on the entire swipe of the card data, and different components of the Fourier spectrum, whether the magnitude or phase of the spectral component, can be utilized for the signature. Accordingly, the process can be implemented to take one large high-resolution Fourier transform or multiple lower-resolution Fourier transforms. One advantage of implementing the process to utilize a large Fourier transform is that low frequency characteristics of the bit-width variations can be captured across the entire swipe. Accordingly, in some embodiments, the segment can be larger to facilitate capture of lower frequency characteristics; and in other embodiments, the entire data set can be used and the segmentation step 206 avoided.

In embodiments where it is broken into segments, the segments can but need not be segments of contiguous bits. For example, every nth bit or other nonsequential selection of bits can be chosen for the data segments. The bit order can be chosen differently for different tokens or token types. In some embodiments, a pseudorandom generator can be used to define the bit order. For example, a credit card number or other seed can be used to seed the pseudorandom generator to provide some level of randomness to the sequence from card to card before computing the signature. Using a card or token feature such as the credit card number to seed the pseudorandom generator can provide a mechanism to ensure that the same order is used across multiple swipes. Utilizing such mechanisms to change the order of data bits in the segment can be implemented in some embodiments to make the system more difficult to hack or reverse engineer the signature generation.

Figure 5:
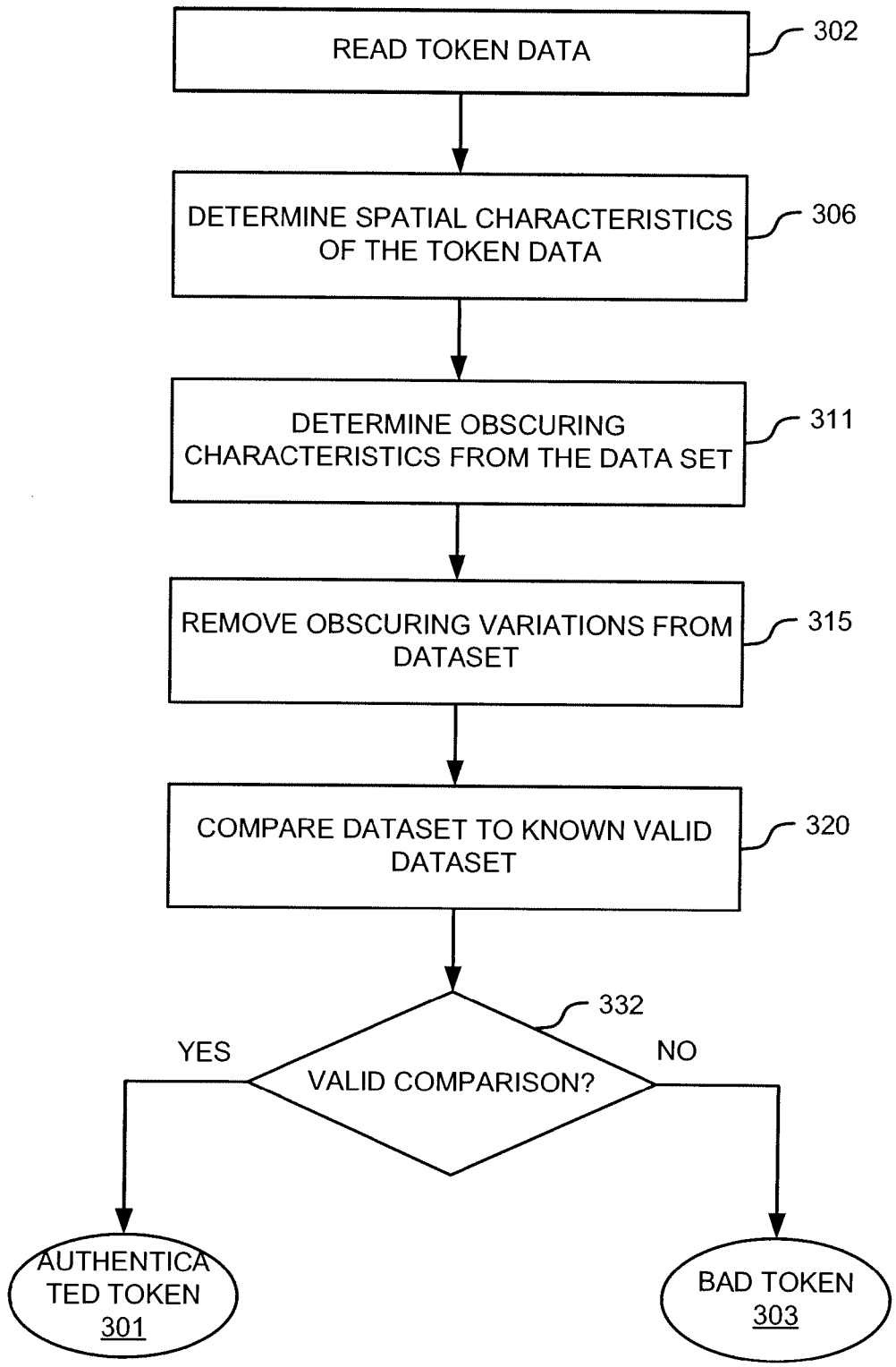
FIG. 5 is a diagram illustrating an example process for removing obscuring characteristics from the data set in accordance with one embodiment of the invention.

FIG. 5 is a diagram illustrating an example process for removing obscuring characteristics from the data set in accordance with one embodiment of the invention. In one embodiment, data that can obscure signature data can be discarded or given lesser weight in the signature process. This can include things such as such as bad or weak data that might be caused by card anomalies, manufacturing tolerances on the card or reader, environmental factors, anomalies on the card, or other weak or obscured data that might not be consistent from swipe to swipe.

Referring now to FIG. 5, in step 302 the token data is read. In step 306, a series of one or more spatial characteristics of the token data are determined. For example, in accordance with embodiments described above, the average bit width or the Fourier transform of the data can be computed to reveal the spatial characteristics of the data. From this data set, obscuring characteristics are determined and removed from the data set as illustrated at steps 311 and 315. In terms of examples described above, averaging bit widths in a segment and comparing a measured bit width to the average can be a technique for minimizing, reducing or removing obscuring characteristics. For example, if the temperature of the card rises, causing expansion in the card, the bit widths could rise as well. In such a circumstance, comparing an obtained bit-width to a stored bit width could yield a false positive. However, if the obtained bit width is compared to the average, and this deviation compared to the master deviation, external factors that might affect most of or all of the bits can be accounted for.

As another example, in one embodiment the DC component or average of the data set is discarded. This can be useful, for example, to factor out environmental conditions from the signature or authentication process. To illustrate this consider the example scenario where a credit card is presented for authentication in an extreme temperature environment. This environment can cause the physical embodiment of the track data to expand or contract affecting the average bit width. Therefore, if the DC component of the Fourier transform or the average bit width is used to authenticate the card, this environmental condition could increase the likelihood of an authentic card being falsely identified as a fraudulent card. Therefore, discarding this component can help remove obscuring characteristics from the data set. Likewise, embodiments described above where variations of individual bits from the average can also have the same effect. In addition, uncorrelated or inconsistent data points as described above can also have the effect of obscuring valid data.

As also described above, the methodologies for building a data set and removing obscuring variations or characteristics from the data set can be used not only to build the master signature for the token, but also to generate a subsequent signature for a presented token to compare to the master signature. In the case of this latter scenario, at step 320, a signature generated is compared to a known valid master signature and if the comparison is valid (step 332) the token is authenticated 301. In the comparison is not valid, this is an indication of an invalid token 303.

As the above examples illustrate, systems and methods described herein can be used to build a master signature for a token and also to generate an authenticating signature to validate the authenticity of the token. As these examples further illustrate, the master signature can be generated over time or over a plurality of data sets to increase the level of confidence in the signature. Generally speaking, the more a card is swiped, the more data in the data set, and the greater the statistical confidence in the signature. Data parameters or characteristics that are shown to be more consistent over a large number of samplings tend to be more reliable parameters or characteristics for signature comparison.

Also, because physical characteristics can change over time, more recent data can tend to be better data for authentication purposes. Therefore, in some embodiments, more recent data sets are weighted more heavily than older data sets. In addition, data sets beyond a certain age can be discarded. For example, a FIFO or other like scenario can be utilized such that every time (or every x times) a card is swiped, the oldest data set can be thrown away and the signature recomputed with the newest data set added into the computation. As another example, a weighted averaging filter equation can be used to make the effect of the old swipes decay away as new swipes come in. Accordingly, the data set can be limited for the master signature to a predetermined number of previous swipes.

In yet another embodiment, a time factor can be applied to loosen the signature matching requirements based on how long it has been since the token was last read. Even if the card has not been swiped in a while, its characteristics can change over time simply, for example, by being carried in a wallet or purse or the like. Accordingly, in one embodiment, if a card is swiped for the first time in a long period of time in the authentication requirements can be loosened, and likewise, the master signature can be regenerated based on the new swiped data if the card is indeed authenticated.

As described above, in various embodiments weighting can be used for components of the signature, and various methodologies can be used to assign weightings to the components. In one embodiment, the weightings are assigned such that the sum of all the weightings adds up to 1. Accordingly, each weight can be a number less than 1. Likewise, the comparison for each segment can be computed such that the result of the comparison is a number between 0 and 1. For example, the per use value for a segment can be subtracted from the master value for that segment and the result divided by the master value, resulting in a number whose absolute value is between 0 and 1.

To illustrate, consider an example in which there are a components to each signature. With the above assumptions, a perfect match between components results in a score of 1 for that component, and a non-match results in a score of 0 (or significantly less than 1) for that component. Further to this illustration, assume a system has calculated the following weightings based on the repeatability of each component over several swipes: (1) 0.1; (2) 0.03; (3) 0.22; (4) 0.13; (5) 0.09; (6) 0.04; (7) 0.36; and (8) 0.03. In this example, all the weights add up to 1.0. To continue the illustration, assume that the comparison result for each of the 8 components from a single swipe (when compared to the master signature using the component comparison function) is as follows: (1) 0.90; (2) 0.71; (3) 0.96; (4) 0.88; (5) 0.93; (6) 0.72; (7) 0.97; (8) 0.70. In this example the resulting weighted signature score would be: 0.1*0.09+0.03*0.71+0.22*0.96+0.13*0.88+ 0.09*0.93+0.04*0.72+0.36*0.97+0.03*0.70=0.8386, which is a number less than one. In this example, if the valid signature threshold is set below 0.8386 then this would be identified as a valid card, otherwise it would be flagged as a fraud.

As one of ordinary skill will appreciate after reading this description, this score can be used in a plurality of different ways. For example, the repeatability of the final signature comparison value (i.e. the score) could be used to determine where to set the threshold for the next comparison. If this method were used instead of using the variability of each component in the signature then all weights would most likely be set to the same value (probably ⅛ in the above example) so that each comparison would contribute the same amount to the final score. Of course this would be less accurate than using the repeatability of each component. In addition, a combination of both methods could also be used (i.e. statistically-based weights and a statistically-based scoring threshold), but testing would probably be required to see if this works any better than just using individual component weightings.

Signature data can be quantized or scaled to fit into a predefined payload package for communication. For example, if a maximum space of 10 8-bit values is available to transfer the signature then, the signature can include 10 signature components quantized into 8-bit values, 20 signature components quantized into 4-bit values, and so on. These methods would generate an 80-bit signature to take advantage of the available 80-bit payload space. Each of these could also use one or more bits to generate each component. Furthermore, the payload could contain multiple types of signature data. For example, the 1st few bits of the character could contain the magnitude data and the next few bits could contain the phase data. As another example, a portion of the word could contain spectral data and another portion the average deviations.

Figure 6:
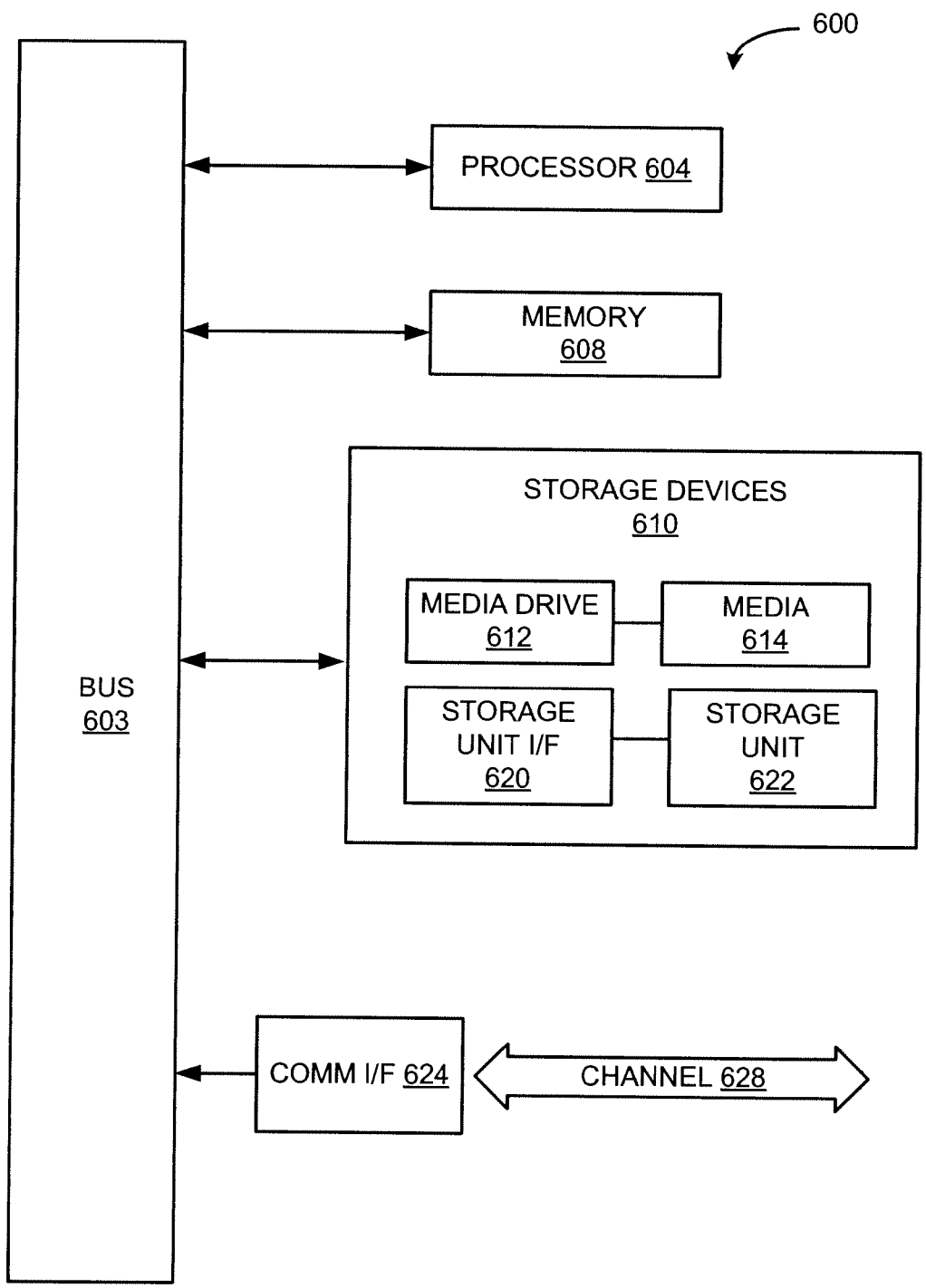
FIG. 6 is a diagram illustrating an example computing module including an example processing device in accordance with one embodiment of the invention.

As used herein, the term module might describe a given unit of functionality that can be performed in accordance with one or more embodiments of the present invention. As used herein, a module might be implemented utilizing any form of hardware, software, or a combination thereof. For example, one or more processors, controllers, ASICs, PLAs, logical components, software routines or other mechanisms might be implemented to make up a module. In implementation, the various modules described herein might be implemented as discrete modules or the functions and features described can be shared in part or in total among one or more modules. In other words, as would be apparent to one of ordinary skill in the art after reading this description, the various features and functionality described herein may be implemented in any given application and can be implemented in one or more separate or shared modules in various combinations and permutations. Even though various features or elements of functionality may be individually described or claimed as separate modules, one of ordinary skill in the art will understand that these features and functionality can be shared among one or more common software and hardware elements, and such description shall not require or imply that separate hardware or software components are used to implement such features or functionality.

Where components or modules of the invention are implemented in whole or in part using software, in one embodiment, these software elements can be implemented to operate with a computing or processing module capable of carrying out the functionality described with respect thereto. One such example-computing module is shown in FIG. 6. Various embodiments are described in terms of this example-computing module 600. After reading this description, it will become apparent to a person skilled in the relevant art how to implement the invention using other computing modules or architectures.

Referring now to FIG. 6, computing module 600 may represent, for example, computing or processing capabilities found within desktop, laptop and notebook computers; handheld computing devices (PDA's, smart phones, cell phones, palmtops, etc.); mainframes, supercomputers, workstations or servers; or any other type of special-purpose or general-purpose computing devices as may be desirable or appropriate for a given application or environment. Computing module 600 might also represent computing capabilities embedded within or otherwise available to a given device. For example, a computing module might be found in other electronic devices such as, for example, digital cameras, navigation systems, cellular telephones, portable computing devices, modems, routers, WAPs, terminals and other electronic devices that might include some form of processing capability.

Computing module 600 might include, for example, one or more processors, controllers, control modules, or other processing devices, such as a processor 604. Processor 604 might be implemented using a general-purpose or special-purpose processing engine such as, for example, a microprocessor, controller, or other control logic. In the example illustrated in FIG. 6, processor 604 is connected to a bus 602, although any communication medium can be used to facilitate interaction with other components of computing module 600 or to communicate externally.

Computing module 600 might also include one or more memory modules, simply referred to herein as main memory 608. For example, preferably random access memory (RAM) or other dynamic memory, might be used for storing information and instructions to be executed by processor 604. Main memory 608 might also be used for storing temporary variables or other intermediate information during execution of instructions to be executed by processor 604. Computing module 600 might likewise include a read only memory ("ROM") or other static storage device coupled to bus 602 for storing static information and instructions for processor 604.

The computing module 600 might also include one or more various forms of information storage mechanism 610, which might include, for example, a media drive 612 and a storage unit interface 620. The media drive 612 might include a drive or other mechanism to support fixed or removable storage media 614. For example, a hard disk drive, a floppy disk drive, a magnetic tape drive, an optical disk drive, a CD or DVD drive (R or RW), or other removable or fixed media drive might be provided. Accordingly, storage media 614, might include, for example, a hard disk, a floppy disk, magnetic tape, cartridge, optical disk, a CD or DVD, or other fixed or removable medium that is read by, written to or accessed by media drive 612. As these examples illustrate, the storage media 614 can include a computer usable storage medium having stored therein computer software or data.

In alternative embodiments, information storage mechanism 610 might include other similar instrumentalities for allowing computer programs or other instructions or data to be loaded into computing module 600. Such instrumentalities might include, for example, a fixed or removable storage unit 622 and an interface 620. Examples of such storage units 622 and interfaces 620 can include a program cartridge and cartridge interface, a removable memory (for example, a flash memory or other removable memory module) and memory slot, a PCMCIA slot and card, and other fixed or removable storage units 622 and interfaces 620 that allow software and data to be transferred from the storage unit 622 to computing module 600.

Computing module 600 might also include a communications interface 624. Communications interface 624 might be used to allow software and data to be transferred between computing module 600 and external devices. Examples of communications interface 624 might include a modem or softmodem, a network interface (such as an Ethernet, network interface card, WiMedia, IEEE 802.XX or other interface), a communications port (such as for example, a USB port, IR port, RS232 port Bluetooth® interface, or other port), or other communications interface. Software and data transferred via communications interface 624 might typically be carried on signals, which can be electronic, electromagnetic (which includes optical) or other signals capable of being exchanged by a given communications interface 624. These signals might be provided to communications interface 624 via a channel 628. This channel 628 might carry signals and might be implemented using a wired or wireless communication medium. These signals can deliver the software and data from memory or other storage medium in one computing system to memory or other storage medium in computing system 600. Some examples of a channel might include a phone line, a cellular link, an RF link, an optical link, a network interface, a local or wide area network, and other wired or wireless communications channels.

In this document, the terms "computer program medium" and "computer usable medium" are used to generally refer to physical storage media such as, for example, memory 608, storage unit 620, and media 614. These and other various forms of computer program media or computer usable media may be involved in storing one or more sequences of one or more instructions to a processing device for execution. Such instructions embodied on the medium, are generally referred to as "computer program code" or a "computer program product" (which may be grouped in the form of computer programs or other groupings). When executed, such instructions might enable the computing module 600 to perform features or functions of the present invention as discussed herein.

While various embodiments of the present invention have been described above, it should be understood that they have been presented by way of example only, and not of limitation. Likewise, the various diagrams may depict an example architectural or other configuration for the invention, which is done to aid in understanding the features and functionality that can be included in the invention. The invention is not restricted to the illustrated example architectures or configurations, but the desired features can be implemented using a variety of alternative architectures and configurations. Indeed, it will be apparent to one of skill in the art how alternative functional, logical or physical partitioning and configurations can be implemented to implement the desired features of the present invention. Also, a multitude of different constituent module names other than those depicted herein can be applied to the various partitions. Additionally, with regard to flow diagrams, operational descriptions and method claims, the order in which the steps are presented herein shall not mandate that various embodiments be implemented to perform the recited functionality in the same order unless the context dictates otherwise.

Although the invention is described above in terms of various exemplary embodiments and implementations, it should be understood that the various features, aspects and functionality described in one or more of the individual embodiments are not limited in their applicability to the particular embodiment with which they are described, but instead can be applied, alone or in various combinations, to one or more of the other embodiments of the invention, whether or not such embodiments are described and whether or not such features are presented as being a part of a described embodiment. Thus, the breadth and scope of the present invention should not be limited by any of the above-described exemplary embodiments.

Terms and phrases used in this document, and variations thereof, unless otherwise expressly stated, should be construed as open ended as opposed to limiting. As examples of the foregoing: the term "including" should be read as meaning "including, without limitation" or the like; the term "example" is used to provide exemplary instances of the item in discussion, not an exhaustive or limiting list thereof; the terms "a" or "an" should be read as meaning "at least one," "one or more" or the like; and adjectives such as "conventional," "traditional," "normal," "standard," "known" and terms of similar meaning should not be construed as limiting the item described to a given time period or to an item available as of a given time, but instead should be read to encompass conventional, traditional, normal, or standard technologies that may be available or known now or at any time in the future. Likewise, where this document refers to technologies that would be apparent or known to one of ordinary skill in the art, such technologies encompass those apparent or known to the skilled artisan now or at any time in the future.

The presence of broadening words and phrases such as "one or more," "at least," "but not limited to" or other like phrases in some instances shall not be read to mean that the narrower case is intended or required in instances where such broadening phrases may be absent. The use of the term "module" does not imply that the components or functionality described or claimed as part of the module are all configured in a common package. Indeed, any or all of the various components of a module, whether control logic or other components, can be combined in a single package or separately maintained and can further be distributed in multiple groupings or packages or across multiple locations.

Additionally, the various embodiments set forth herein are described in terms of exemplary block diagrams, flow charts and other illustrations. As will become apparent to one of ordinary skill in the art after reading this document, the illustrated embodiments and their various alternatives can be implemented without confinement to the illustrated examples. For example, block diagrams and their accompanying description should not be construed as mandating a particular architecture or configuration.

The invention claimed is:

1. A method for characterizing a magnetic stripe card based on spatial characteristics of data encoded on a magnetic stripe of the card, the method comprising the steps of:
    using a magnetic stripe reader to read a waveform of data encoded on the magnetic stripe of the card;
    parameterizing the waveform of the data encoded on the card to determine spatial features of the waveform;
    characterizing a subset of the spatial features of the waveform to determine spatial characteristics of the waveform, comprising computing a function of the spatial parameters for a plurality of bits in a segment of the data, wherein computing the function comprises comparing a bit width to other bit widths, comparing a bit width to an average of bit widths, computing a ratio of bit widths, comparing bit averages to other bit averages, comparing median bit widths to average bit widths, or comparing ratios of bit widths to peak widths; and
    determining a characterization signature of the magnetic stripe card using the spatial characteristics, wherein the characterization signature characterizes the magnetic stripe card.

2. The method of claim 1, wherein the spatial features comprise a bit width, a peak shape, a peak width, a rise time, or a fall time.

3. A method for characterizing a magnetic stripe card based on spatial characteristics of data encoded on a magnetic stripe of the card, the method comprising the steps of:
    using a magnetic stripe reader to read a waveform of data encoded on the magnetic stripe of the card;
    parameterizing the waveform of the data encoded on the card to determine spatial features of the waveform;
    characterizing a subset of the spatial features of the waveform to determine spatial characteristics of the waveform, comprising:
        calculating an average bit width for a segment of the data;
        determining a deviation between individual bits in the segment and the average bit width calculated for the segment; and
        averaging the deviations determined for the individual ones of the bits in the segment to determine an average deviation for the segment; and
    determining a characterization signature of the magnetic stripe card using the spatial characteristics, wherein the characterization si nature characterizes the magnetic stripe card.

4. The method of claim 3, wherein the segment comprises all or a part of the data encoded on the magnetic stripe card.

5. The method of claim 3, wherein the steps of calculating, determining and averaging are performed for a plurality of segments of data encoded on the magnetic stripe, and wherein the fingerprint comprises the average deviations for some or all of the plurality of segments.

6. The method of claim 5, wherein a segment comprises a single bit or a consecutive plurality of bits.

7. The method of claim 5, wherein a segment comprises a plurality of non-consecutive individual bits of the encoded data.

8. The method of claim 5, wherein the steps of calculating, determining and averaging performed for the plurality of segments are performed for a plurality of read operations and wherein the method further comprises the step of determining the consistency of results obtained for each segment across the multiple read operations.

9. The method of claim 5, wherein the fingerprint is further determined based on the consistency of the results across the multiple read operations.

10. The method of claim 3, wherein the difference between individual ones of the bits and the average bit width is determined as a percentage of the average bit width.

11. The method of claim 3, wherein the steps of reading, parameterizing, and characterizing are performed a plurality of times for the magnetic stripe card to determine the characteristic signature based on a plurality of read operations.

12. The method of claim 3, wherein the step of characterizing a subset of the spatial features of the waveform to determine spatial characteristics further comprises performing a spectral analysis of the spatial features of the waveform.

13. A method for characterizing a magnetic stripe card based on spatial characteristics of data encoded on a magnetic stripe of the card, the method comprising the steps of
    using a magnetic stripe reader to read a waveform of data encoded on the magnetic stripe of the card;
    parameterizing the waveform of the data encoded on the card to determine spatial features of the waveform;
    characterizing a subset of the spatial features of the waveform to determine spatial characteristics of the waveform, comprising performing a spectral analysis of the spatial features of the waveform;

determining a characterization signature of the magnetic stripe card using the spatial characteristics, wherein the characterization signature characterizes the magnetic stripe card; and discarding unreliable spectral components.

14. A method for characterizing a magnetic stripe card based on spatial characteristics of data encoded on a magnetic stripe of the card, the method comprising the steps of:

using a magnetic stripe reader to read a waveform of data encoded on the magnetic stripe of the card;

parameterizing the waveform of the data encoded on the card to determine spatial features of the waveform for multiple read operations;

characterizing a subset of the spatial features of the waveform to determine spatial characteristics of the waveform, comprising:

identifying consistent variations across all bits of the waveform; and disregarding inconsistent variations for purposes of authenticating the magnetic stripe card; and determining a characterization signature of the magnetic stripe card using the spatial characteristics, wherein the characterization signature characterizes the magnetic stripe card.

15. The method of claim 14, wherein the steps of parameterizing and characterizing are performed for a plurality of read operations to determine a master characterization based on a plurality of data sets.

16. The method of claim 14, wherein the characterization signature defines a master characterization signature for the magnetic stripe card.

17. The method of claim 16, further comprising, for a magnetic stripe card presented for a transaction, performing the steps of:

using a magnetic stripe reader to read a waveform of data encoded on the magnetic stripe of the card presented for the transaction;

parameterizing the waveform of the data encoded on the card presented for the transaction to determine spatial features of the waveform of the card presented for the transaction;

characterizing a subset of the spatial features of the waveform of the card presented for the transaction to determine spatial characteristics of the waveform;

determining a transaction characterization signature for the magnetic-stripe card presented for the transaction; and comparing the transaction characterization signature characterization to the master characterization to determine whether the magnetic-stripe-card is authentic.

18. A computer program product comprising a computer useable storage medium having computer program code embodied therein for enabling a processing device to characterize a magnetic stripe card based on spatial characteristics of data encoded on the magnetic stripe of the card, the computer-readable program code comprising:

a computer program code portion for reading data encoded on the magnetic stripe of the card;

a computer program code portion for calculating spatial characterstics of the data encoded on the card, comprising:

a computer program code portion for calculating spatial characteristics of a bit waveform of the encoded data in a segment of the data; and a computer program code portion for computing a function of bit spatial characteristics for bits in the segment, wherein the computer program code for computing the function comprises a computer program code portion for comparing a bit width to other bit widths, a computer program code portion for comparing a bit width to an average of bit widths, a computer program code portion for computing a ratio of bit widths, a computer program code portion for comparing bit averages to other bit averages, a computer program code portion for comparing median bit widths to average bit widths, or a computer program code portion for comparing ratios of bit widths to peak widths; and a computer program code portion for determining a characterization signature of the magnetic stripe card using the spatial characteristics, wherein the signature characterizes the magnetic stripe card.

19. The computer program product of claim 18, wherein the spatial characteristic comprises bit width, a peak shape, a rise time, or a fall time.

20. A computer program product comprising a computer useable storage medium having computer program code embodied therein for enabling a processing device to characterize a magnetic stripe card based on spatial characteristics of data encoded on the magnetic stripe of the card, the computer-readable program code comprising:

a computer program code portion for reading data encoded on the magnetic stripe of the card;

a computer program code portion for calculating spatial characteristics of the data encoded on the card, comprising:

a computer program code portion for calculating spatial characteristics of a bit waveform of the encoded data in a segment of the data;

a computer program code portion for computing a function of bit spatial characteristics for bits in the segment;

a computer program code portion for calculating an average bit width for a segment of the data;

a computer program code portion for determining a deviation between individual bits in the segment and the average bit width calculated for the segment; and a computer program code portion for averaging the deviations determined for the individual ones of the bits in the segment to determine an average deviation for the segment; and a computer program code portion for determining a characterization signature of the magnetic stripe card using the spatial characteristics, wherein the signature characterizes the magnetic stripe card.

21. The computer program product of claim 20, wherein the segment comprises all or a part of the data encoded on the magnetic stripe card.

22. The computer program product of claim 20, wherein the computer program code portion for calculating, determining and averaging is configured to perform these operations for a plurality of segments of data encoded on the magnetic stripe, and wherein the fingerprint comprises the average deviations for some or all of the plurality of the segments.

23. The computer program product of claim 22, wherein the segments comprise portions of the data comprising a consecutive plurality of bits.

24. The computer program product of claim 22, wherein the segments comprise a plurality of non-consecutive individual bits of the encoded data.

25. The computer program product of claim 22, wherein the computer program code portion for calculating, determining and averaging is configured to perform these operations for a plurality of read operations and further comprising a computer program code portion for determining the consistency of results obtained for each segment across the multiple read operations.

26. The computer program product of claim 22, wherein the computer program code is further configured to determine the fingerprint based on the consistency of the results across the multiple read operations.

27. The computer program product of claim 20, wherein the compute program code is further configured to determine difference between individual ones of the bits and the average bit width as a percentage of the average bit width.

28. A computer program product comprising a computer useable storage medium having computer program code embodied therein for enabling a processing device to characterize a magnetic stripe card based on spatial characteristics of data encoded on the magnetic stripe of the card, the computer-readable program code comprising:
 a computer program code portion for calculating spatial characteristics of the data encoded on the card, comprising:
  a computer program code portion for calculating a characteristics of the data bit encoded on the card, comprising:
   a computer program code portion for calculating spatial characteristics of the bit waveform of the encoded data for a segment of the data; and
   a computer program code portion for performing a spectral analysis of the bit widths calculated in the segment; and
 a computer program code portion for determining a characterization signature of the magnetic stripe card using the spatial characteristics, wherein the signature characterizes the magnetic stripe card.

29. The computer program product of claim 28, further comprising a computer program code portion for discarding unreliable spectral components.

30. A computer program product comprising a computer useable storage medium having computer program code embodied therein for enabling a processing device to characterize a magnetic stripe card based on spatial characteristics of data encoded on the magnetic stripe of the card, the computer-readable program code comprising:
 a computer program code portion for reading data encoded on the magnetic stripe of the card;
 a computer program code portion for calculating spatial characteristics of the data encoded on the card, comprising:
  a computer program code portion for measuring a spatial parameter of data bits encoded on the magnetic stripe for multiple read operations;
  a computer program code portion for identifying consistent variations across all bits; and
  a computer program code portion for disregarding inconsistent variations for purposes of authenticating the magnetic stripe card; and
 a computer program code portion for determining a characterization signature of the magnetic stripe card using the spatial characteristics, wherein the signature characterizes the magnetic stripe card.

31. The computer program product of claim 30, wherein the computer program code is configured to calculate the spatial characteristics for a plurality of read operations to determine a master characterization based on a plurality of data sets.

32. The computer program product of claim 30, wherein the characterization signature defines a master characterization signature for the magnetic stripe card.

* * * * *